United States Patent
Hirayama et al.

(10) Patent No.: US 6,181,660 B1
(45) Date of Patent: Jan. 30, 2001

(54) DIGITAL SIGNAL PROCESSOR CIRCUIT FOR REPRODUCTION OF DIGITAL DATA

(75) Inventors: Hiroshi Hirayama, Yokohama; Toshifumi Takeuchi, Tokyo; Hiroyuki Gunji, Hitachinaka, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/185,096

(22) Filed: Nov. 3, 1998

(30) Foreign Application Priority Data

Nov. 4, 1997  (JP) .................................................. 9-301831

(51) Int. Cl.[7] ...................................................... G11B 5/76
(52) U.S. Cl. .............................................. 369/59; 369/47
(58) Field of Search .................................. 369/47, 48, 49, 369/54, 58, 59, 124.01, 124.04, 124.07, 124.08; 360/27, 29

(56) References Cited

U.S. PATENT DOCUMENTS

| | | | |
|---|---|---|---|
| 4,328,580 | * 5/1982 | Stockham, Jr. et al. | ............ 369/59 X |
| 5,848,046 | * 12/1998 | Sawada | ................................. 369/48 |

FOREIGN PATENT DOCUMENTS 5-041034  * 2/1993  (JP) .

* cited by examiner

Primary Examiner—Paul W. Huber
(74) Attorney, Agent, or Firm—Antonelli, Terry, Stout & Kraus, LLP

(57) ABSTRACT

A digital signal processor circuit is provided which is operable to perform n-bit serial-to-parallel conversion with respect to data of one-bit serial form as read out of a recording medium thereby enabling correct detection of a synchronization pattern contained for transmission in such n-bit data and also correct data demodulation while at the same time achieving semiconductor integration with less power dissipation. To this end, the digital signal processor circuit includes n shift registers for use in performing data-shifting with respect to n-bit data being transferred, n decoder circuits decoding a sync pattern, a determination circuit determining detection of such sync pattern based on the result of detection from the n decoder circuits, a selector circuit selecting a combination of bit streams to be subject to data demodulation, a latch timing generator generating a latch timing of demodulated data, and a data demodulator circuit, wherein the selector circuit is designed to select demodulated data bits in accordance with the decode state of the n decoders, whist the timing generator circuit is operable to update the latch timing every time the sync pattern detection is performed by the determination circuit.

22 Claims, 15 Drawing Sheets

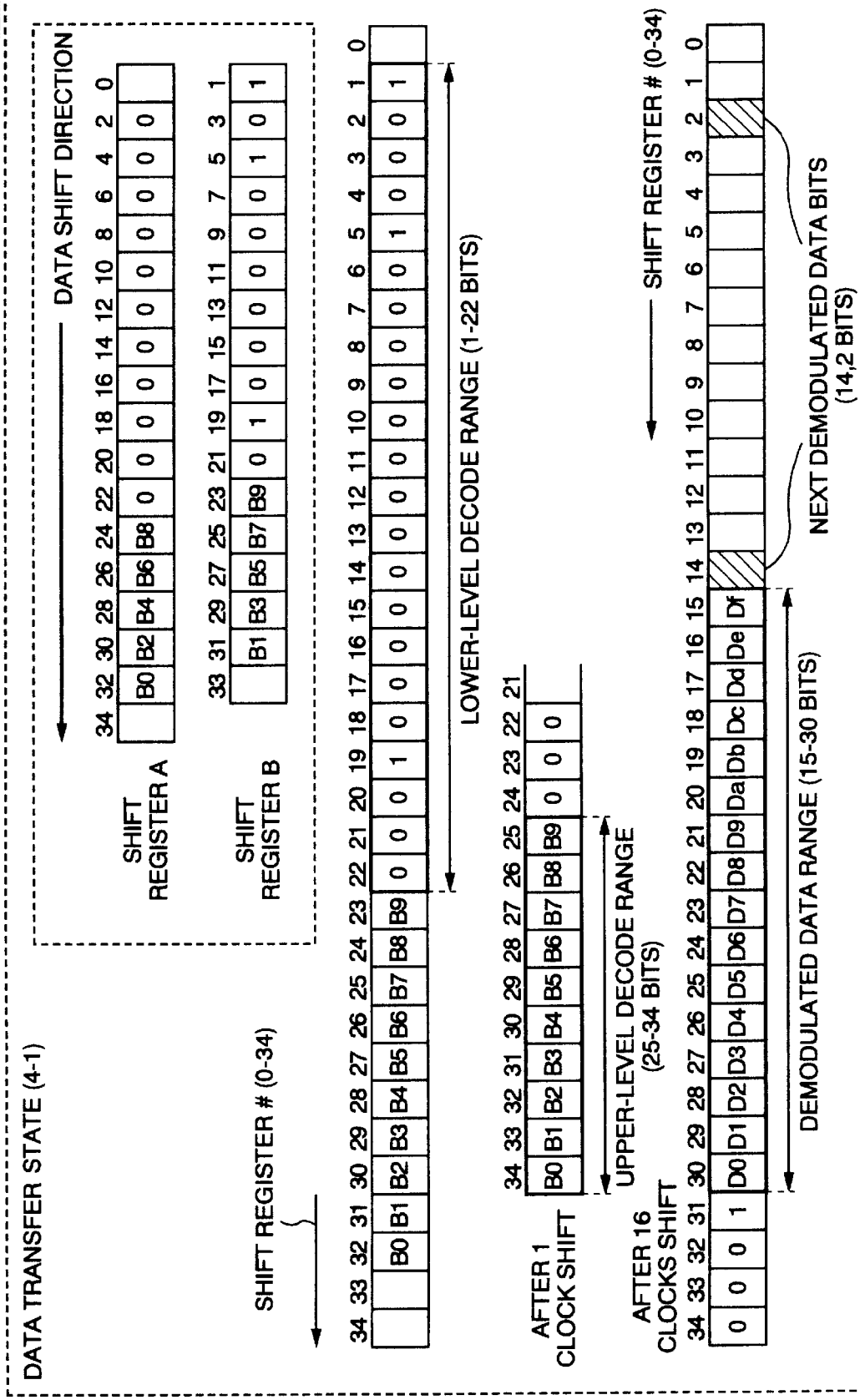

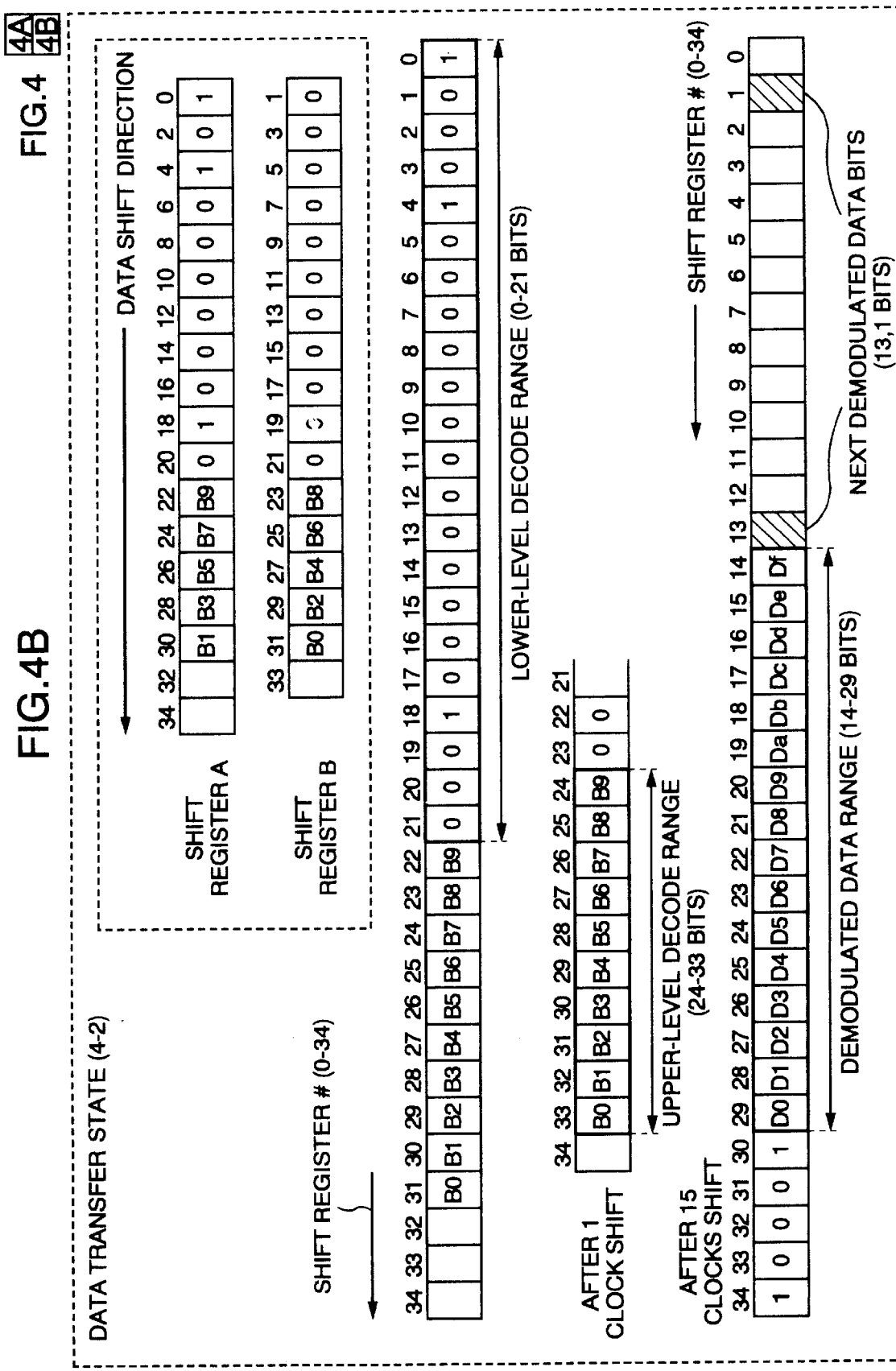

FIG.5
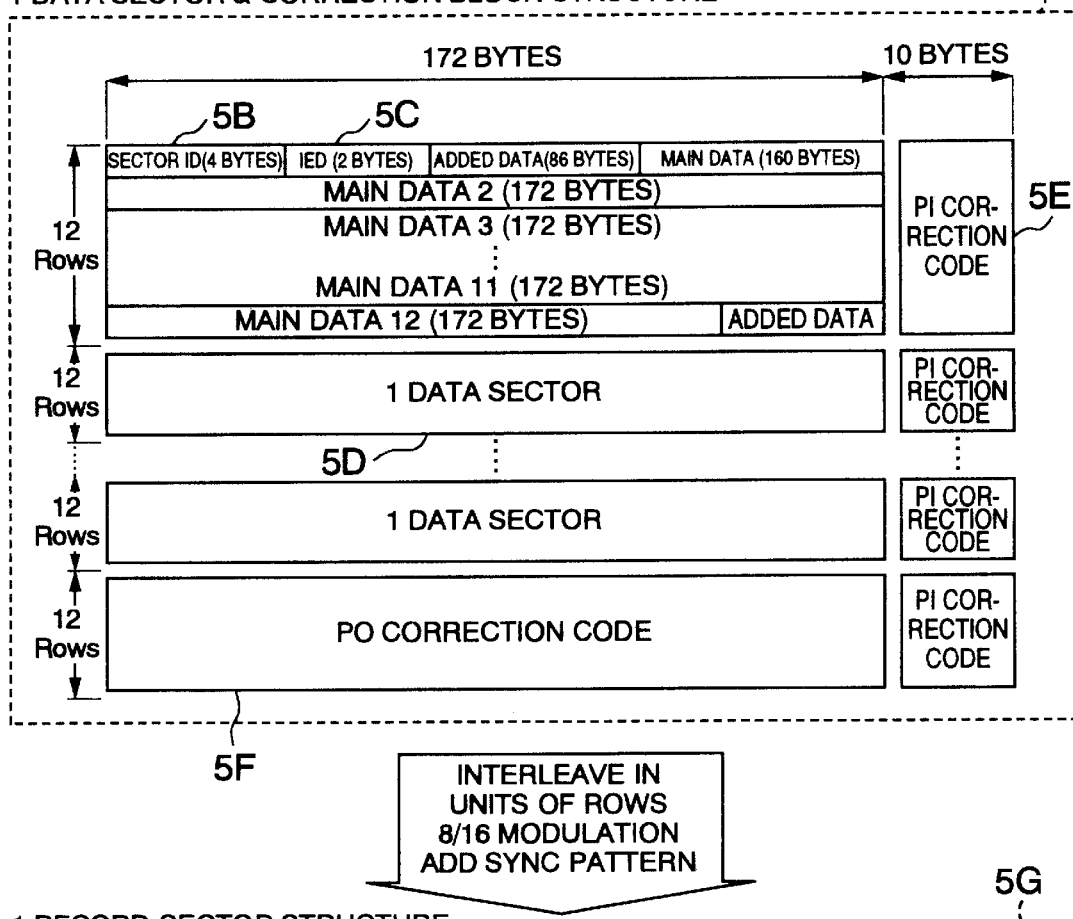
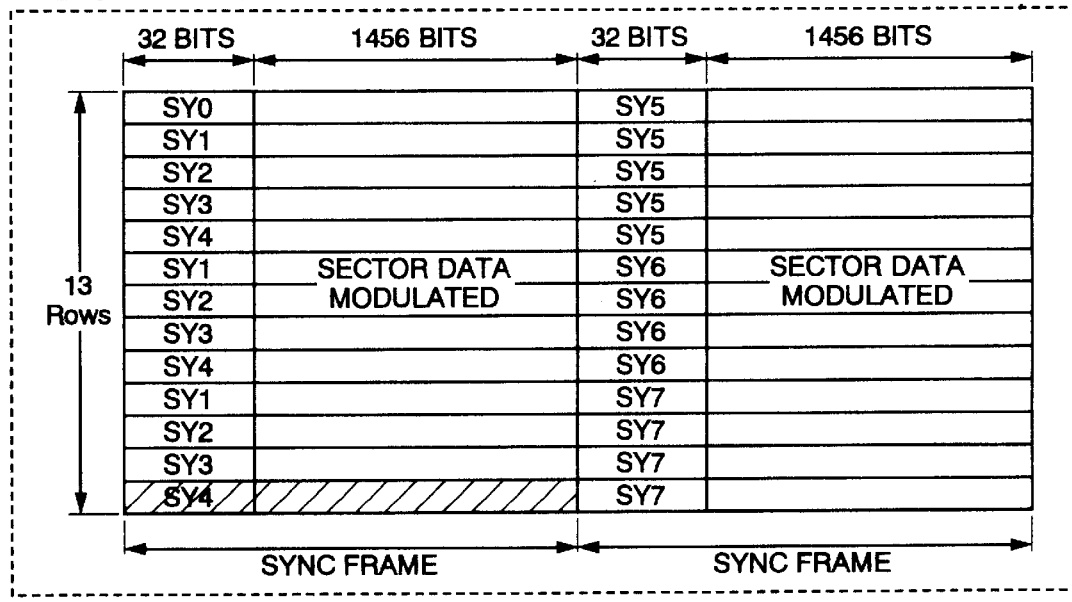

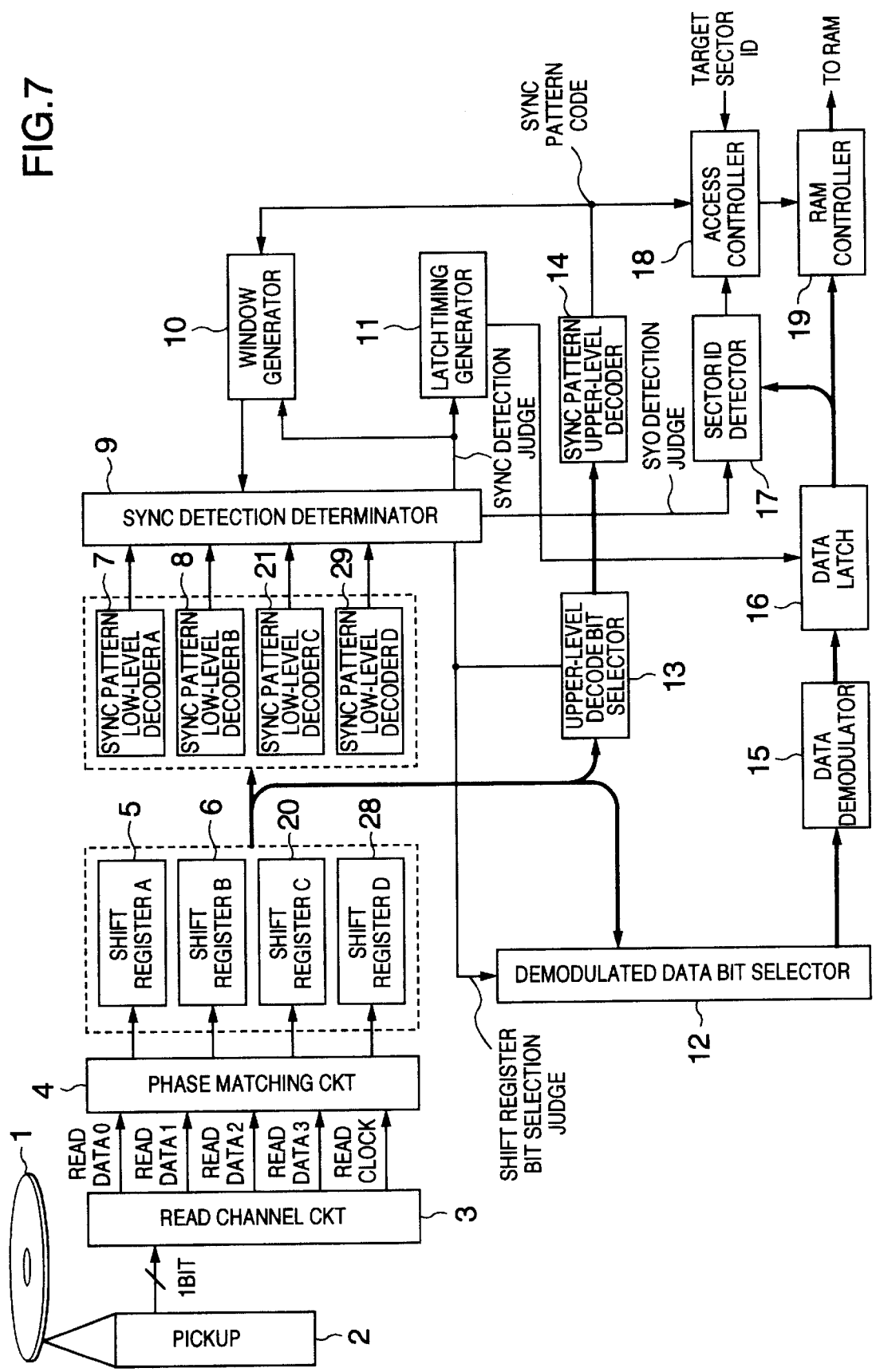

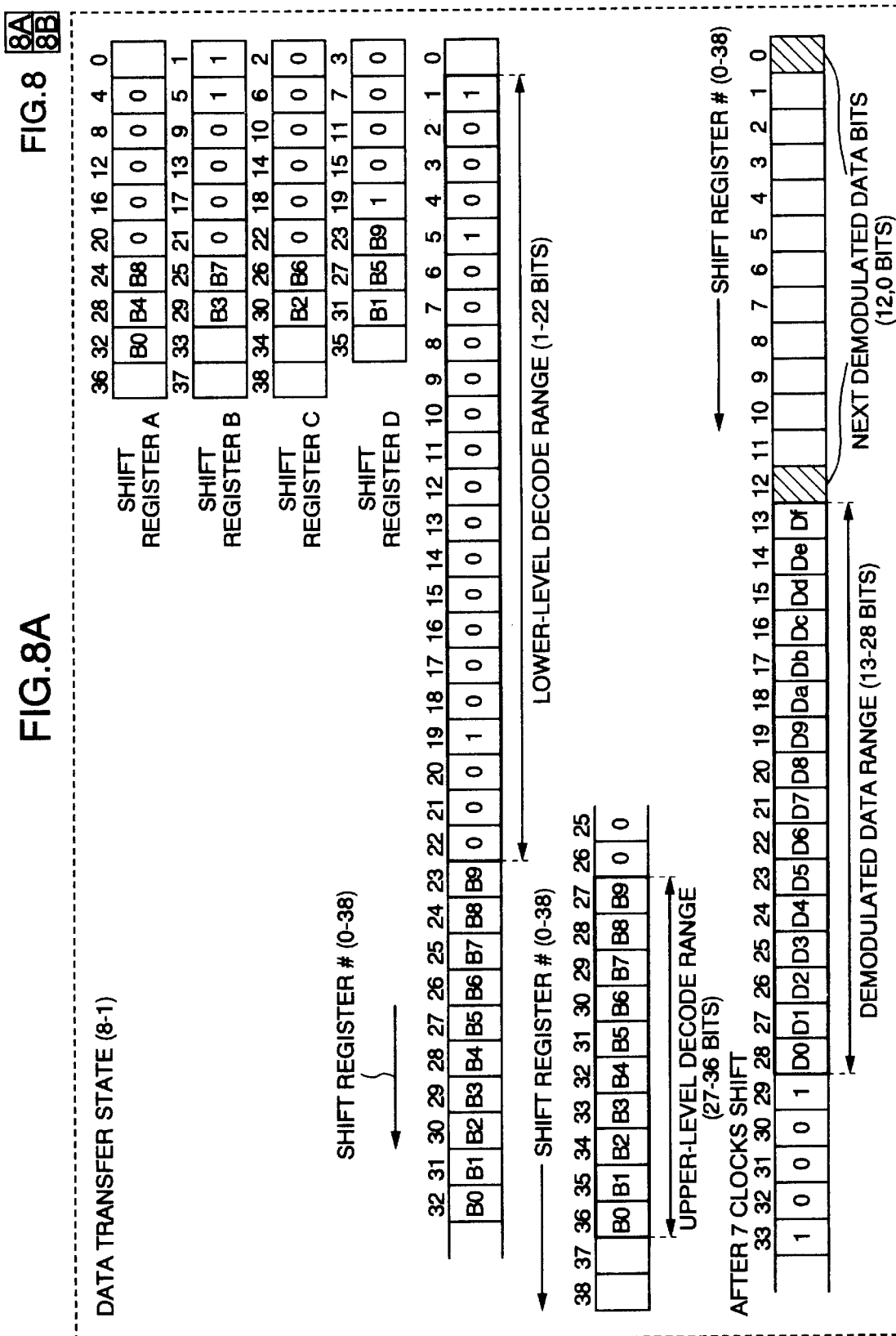

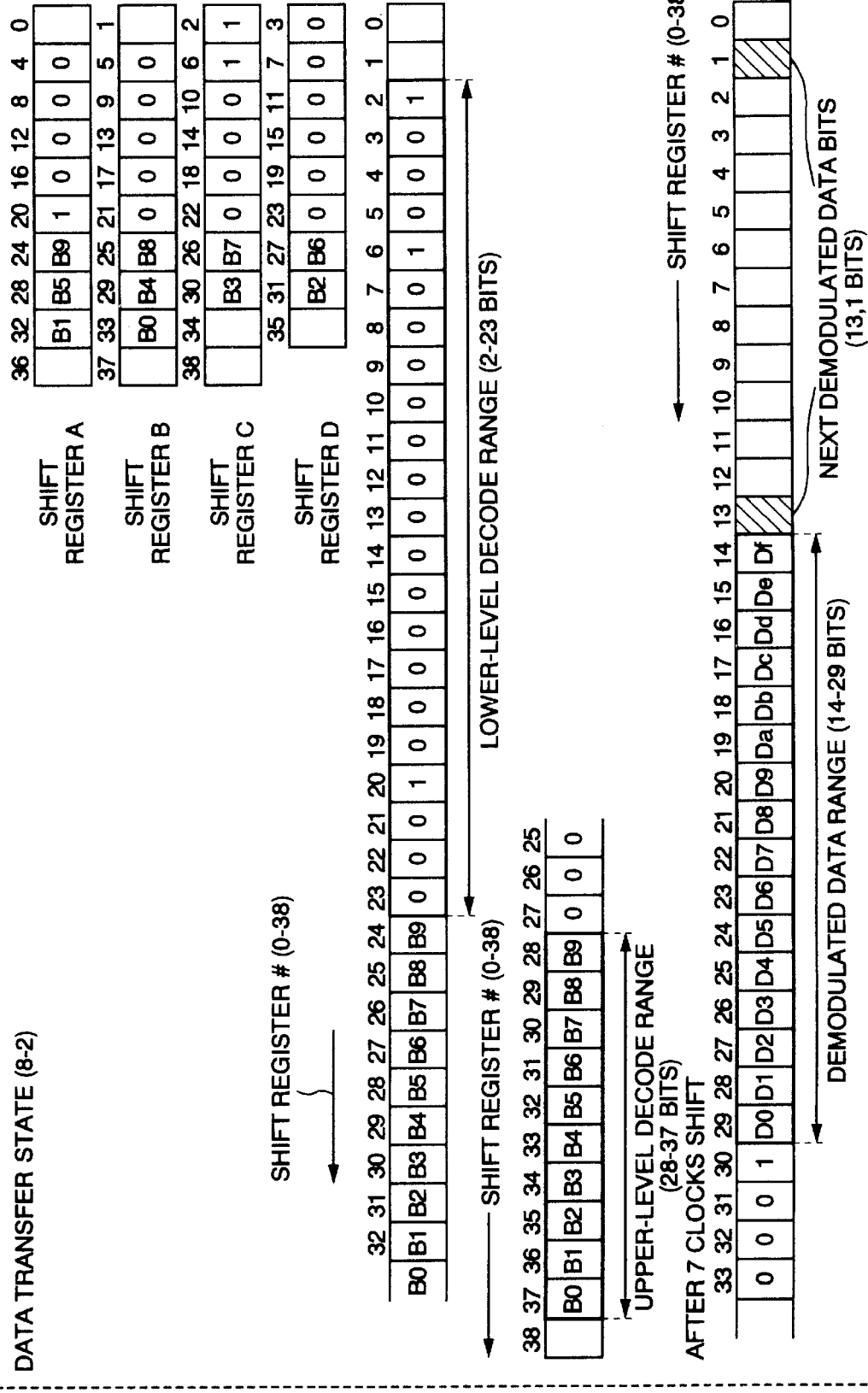

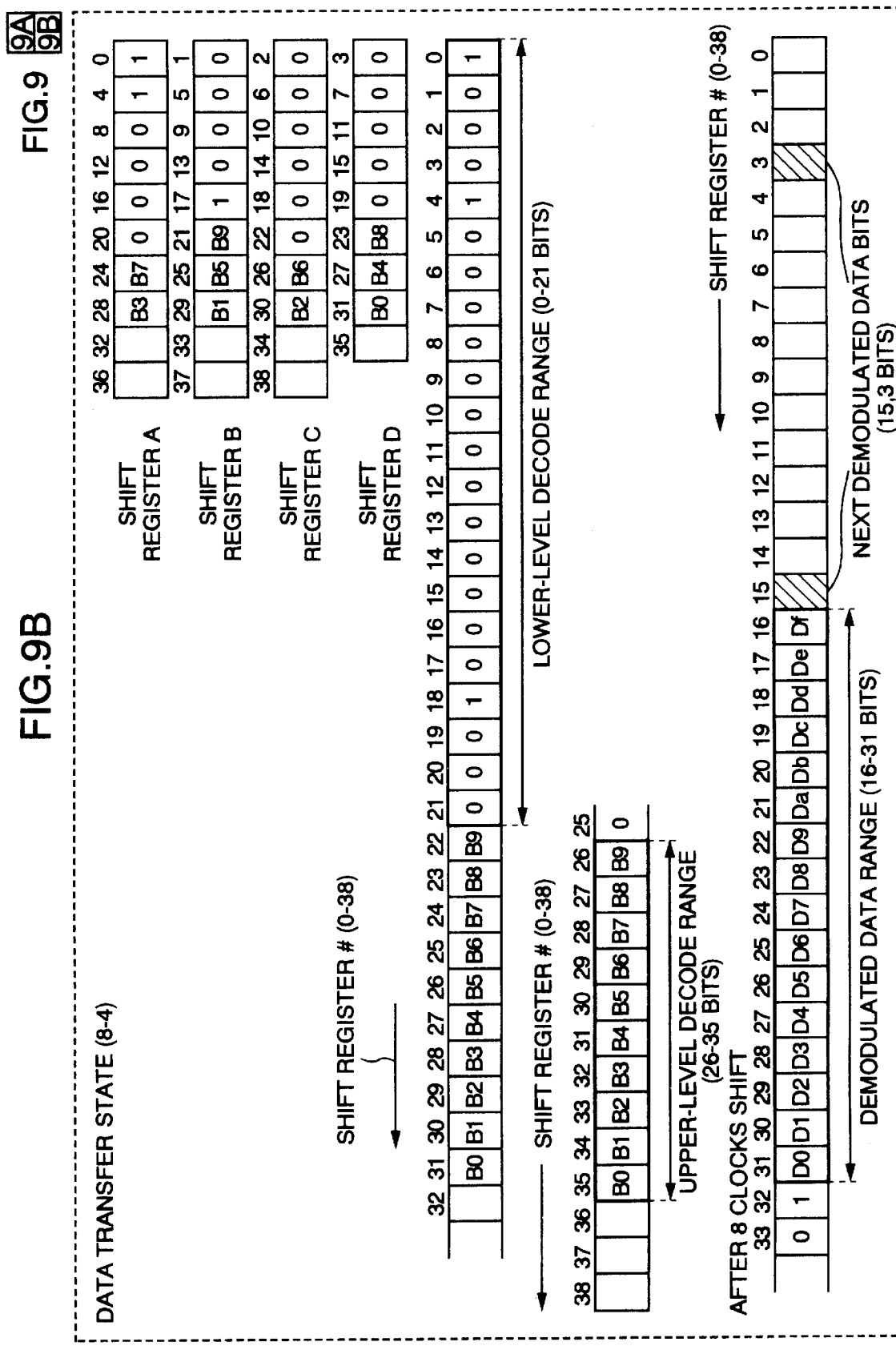

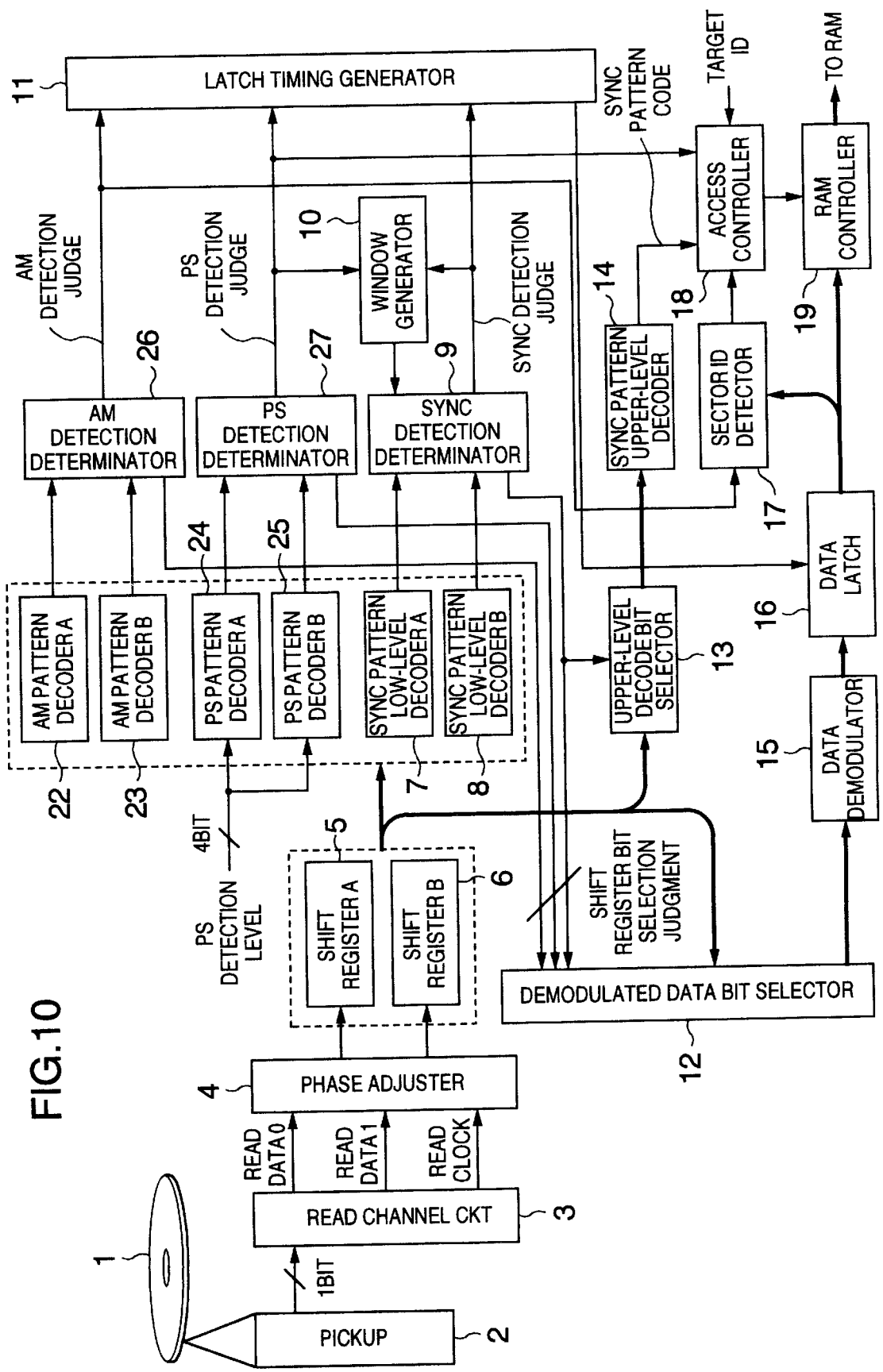

DIGITAL SIGNAL PROCESSOR CIRCUIT FOR REPRODUCTION OF DIGITAL DATA

BACKGROUND OF THE INVENTION

The present invention relates generally to digital signal processing circuitry and, more particularly, to digital signal processor circuits for detecting a specific pattern or patterns including synchronization (sync) signals as contained for successive transmission in digitized 1-bit serial data read out of recording media, and for performing data demodulation with respect to digital data being transferred in succession after a sync pattern to thereby reconstruct or reproduce the original digital data.

Conventionally, digital signal processor circuits of this type include an information playback system adaptable for use in reproducing information signals pre-recorded on an optical storage medium, typically, a disk-shaped optical record carrier body known as "compact disc (CD)." One typical CD record/playback architecture has been disclosed in, for example, "CD—from Audio to PCs" by Kenji Hayashi under the supervision of Fujio Mari, Corona Publishing Co., Ltd., at pp. 13–15 and 62–63. A digital signal processor as taught thereby is designed so that for a stream of digital data bits arrayed in a time sequential manner for recording on disks, a group of data in units of "clusters" of 8 bits may be used to constitute a single frame, and wherein after completion of error correction code addition and inter-frame interleaving as well as sub-code addition, a specific modulation technique, known as the "Eight-to-Fourteen Modulation (EFM)," is employed to modulate the resulting data in units of 8-bit clusters into data with 14 bits being used as a unit to thereby add thereto a margin of 3 bits. A pattern corresponding to a synchronization signal in units of frames, each of which is made up of a plurality of data items with a cluster of 17 bits added with margin bits being as a unit; thereafter, the resultant data is recorded as one (1)-bit serial data on an associative disk in the form of recording marks called the "pits."

During reproduction of data recorded on an optical disk, a disk playback signal that is read by a pickup module from the disk is transferred via a phase locked loop (PLL) circuit as data of 1-bit serial form having a train of bits "0s" and "1s" synchronously with bit clocks. Then, serial-to-parallel conversion processing is applied to this serial data stream to thereby detect one or several sync patterns that are contained in the read data stream. The serial data stream after detection of the sync pattern(s) is converted into a 14-bit parallel data stream, which is then subject to demodulation processing thereby obtaining the demodulated, original data in units of 8-bit segments, which will be written into an associative random-access memory (RAM). Thereafter, control a read/write operation of the RAM to execute error correction through decoding of error codes and de-interleaving processing so that the original time-sequential data may be reproduced.

SUMMARY OF THE INVENTION

To obtain the intended demodulation data through detection of more than one sync signal, the aforementioned prior known demodulation/playback architecture does require the use of a shift register for use in performing serial-to-parallel conversion, a decoder used for decoding the sync pattern, demodulator means for demodulation processing, a data latch temporarily latching therein the data demodulated, a timing generator generating a latch timing signal for use with the demodulated data, and memory control means for performing write/read controls of demodulated data to/from an associated memory.

In recent years, large-capacity data storage devices for use with currently available high-density recording media in digital computer equipment—such as, for example, compact-disc read-only memory (CD-ROM) drive modules and digital versatile disk (DVD) drive units—are endlessly demanded to achieve higher playback data transfer rate. As the data transfer rate increases, semiconductor chips used for digital signal processing necessary for playback of information recorded on such CD-ROMs and DVDs tend to increase in power consumption due to an increase in operating clock frequency thereof.

In order to suppress such increase of unwanted power dissipation in semiconductor chip packages while simultaneously attaining high data transfer rates required, a prior art approach is that as shown in FIG. 2 for example, a 2-bit shift register is used for serial-to-parallel conversion with respect to bit data read out of an optical disk which is in the 1-bit serial form along with bit clocks having a period "f" (where f is a positive number) as synchronized with the data thereby transferring the resulting converted 2-bit read data synchronously with a respective one of the rising and falling edges of read clocks of period (2×f) of the bit clocks; then, such 2-bit read data is subject to sync pattern detection and data demodulation. In this case it is possible to achieve 2-bit data transmission per (2×f)-period read clock. This in turn makes it possible to reduce power dissipation in semiconductor chips accommodating thereon the circuitry for demodulation processing while at the same time maintaining the data transfer rates required.

Unfortunately, the prior art approach is encountered with a problem as follows: when an attempt is made to use the prior art technique for sync pattern detection and data demodulation with respect to transmission of the 2-bit serial data synchronized to those read clocks having the period of (2×f), it must remain unknown which one of the bits of 2-bit data segments carries for transmission the top bit of a sync pattern as contained in a playback signal from a disk for example, which would result in an inability to determine that decoding is to be done from which bit to which bit thereby making it impossible to detect the intended sync pattern or patterns. If this is the case, lack of sync pattern detectability makes data demodulation impossible, or at least extremely difficult. Even where a sync pattern could be detected at a time, it will not be able to guarantee that the top bit of its next succeeding sync pattern is transferred from an expected read data bit that is the same as the previous one; rather, in most cases, such will be sent from different read data bits. In this case also, the intended sync pattern detection will no longer be achievable during the process of data transmission, which results in incapability to obtain any correctly demodulated data.

It is therefore an object of the present invention to provide a digital signal processing circuit for use with those which are designed to transfer n-bit read data obtainable after serial-to-parallel conversion of bit data of 1-bit serial form into n-bit read data synchronously with read clocks of period (f×n) as obtained by n frequency-division of bit clocks of period f, the digital signal processor circuit being capable of correctly detecting a specific pattern such as a synchronization pattern being contained for transmission in such n-bit read data while enabling acquisition of correct demodulation data.

It is another object of the invention to provide a digital signal processor circuit mounted in a semiconductor chip package capable of reducing operating clock frequencies and power dissipation while retaining the data transfer rate required.

To attain the foregoing objects, in accordance with one aspect of the present invention, a digital signal processing circuit is provided which at least includes—as measures for correctly detecting more than one synchronization pattern that is contained for transmission in n-bit read data to be transferred synchronously with read clocks having the period of (f×n) while obtaining correct demodulation data—a specified number, n, of shift registers for use in performing data shifting with respect to each of n-bit read data items, n decoders decoding one or several sync patterns from a stream of bits of the shift registers, a determination circuit judging and determining sync pattern detection based on the condition of detection available from the n decoders, a selector circuit that is responsive to receipt of the bit streams from the shift registers for selecting a combination of bit streams for demodulating data, a latch timing generator circuit which generates and issues a latch timing signal for use with the data obtained after completion of demodulation processing, and a circuit for demodulation of the bit stream presently being selected, wherein the selector circuit is operable, based on the sync pattern detection state obtainable from one of the decoders in the determination circuit, to select an appropriate combination of bit streams of demodulated data, whereas the timing generator circuit updates the latch timing every time sync pattern detection determination is effected by the determination circuit.

These and other objects, features and advantages of the invention will be apparent from the following more particular description of embodiments of the invention, as illustrated in the accompanying drawings.

BRIEF DESCRIPTION OF THE DRAWINGS

FIGS. 4, 4A, and 4B are diagrams for explanation of exemplary transfer states of a sync pattern and demodulated data being sent forth synchronously with the read data 0, 1 in the first embodiment of the invention.

FIG. 5 is a diagram for use in explaining a structure of recording sectors recorded on an optical disk as applied to first and second embodiments of the invention.

FIG. 7 is a block diagram showing a configuration of a digital signal processor circuit in accordance with the second embodiment of the invention.

FIGS. 8, 8A, 8B, 9, 9A, and 9B are explanatory diagrams showing some exemplary transfer states of a sync pattern being transferred by read data 0, 1, 2, 3 and of demodulation data in the second embodiment of the invention.

FIG. 10 is a block diagram showing a configuration of a digital signal processor circuit in accordance with a third embodiment of the invention.

DETAILED DESCRIPTION OF THE PREFERRED EMBODIMENTS

Some embodiments of the present invention will be explained with reference to the accompanying drawings.

Figure 1:
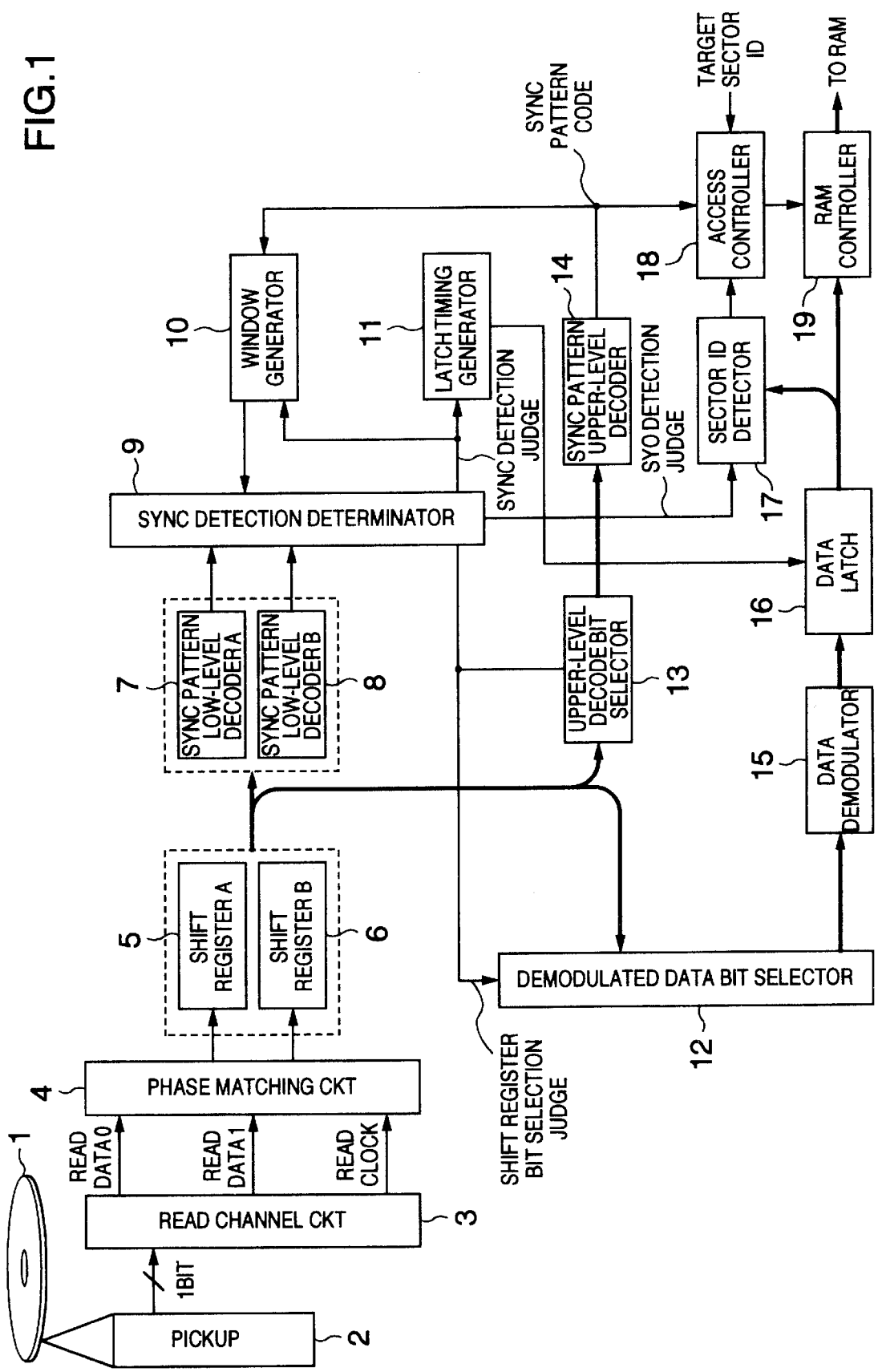
FIG. 1 is a block diagram showing a configuration of a digital signal processor circuit in accordance with a first embodiment of the present invention.

FIG. 1 is a block diagram showing a configuration of a digital signal processing circuit in accordance with a first embodiment of the invention.

In FIG. 1, a reference numeral "1" designates a read-only optical disk that records thereon digital signals obtained by applying to digital data being recorded encoding processing in a predefined format such as adding error correction codes, data modulation, adding synchronization patterns, and the like; numeral 2 denotes a pickup module for use in reading signals recorded on the optical disk 1; 3 represents a read channel circuit which is responsive to receipt of bit data of 1-bit serial form as read by the pickup 2, for generating bit clocks having the period f (where f is a positive number) synchronously therewith through a PLL, and for thereafter performing a serial-to-parallel conversion with respect to the bit data to thereby output 2-bit read data of the values "0" and "1" along with read clocks of period (2×f) as synchronized therewith.

Numeral 4 designates a phase matching circuit that is operable to let the read data with the values of 0 and 1 be in phase at edges with the read clocks; 5 denotes a shift register "A" for use in performing data shifting with respect to the read data 0; 6 indicates another shift register "B" for data-shifting the read data 1; 7 indicates a sync pattern low-level decoder "A" for decoding one or more sync patterns being transferred to the shift registers A5, B6; 8 is a sync pattern low-level decoder "B" for decoding more than one sync pattern in combination of decode bits different from those of the sync pattern low-level decoder A7. Each of the decoders is designed to generate a decode output of transfer sync pattern(s) by pattern-matching techniques.

Numeral 9 denotes a sync detection determination circuit that is responsible to determine correct sync pattern detection based on the decode result of the sync pattern low-level decoders A7, B8 using the sync pattern detect window and determination of bit combination selection with respect to a sync pattern upper-level bit decode as well as determination of demodulation bit combination selection; 10 denotes a window generator circuit generating a window for use in sync pattern detection; 11, a latch timing generator circuit generating a latch timing signal of demodulation data in accordance with the sync pattern detection determination.

Numeral 12 denotes a demodulation data bit selector circuit selecting a combination of demodulated bits in accordance with the selection determination at the sync detection determinator circuit 9; 13 denotes an upper-level decode bit selector circuit selecting a combination of upper-level bits of a sync pattern in accordance with the selection determination at the sync detection determinator circuit 9; 14, a sync pattern upper-level decoder performing code detection of sync patterns available with a plurality of kinds.

15 denotes a data modulation circuit; 16, a data latch circuit latching demodulated data synchronously with the latch timing; 17, a sector ID detector circuit detecting a sector ID indicative of a physical address on a disk which has been recorded at a specified location immediately after the top sync pattern of a section that is a minimal data recording segment or "unit" on the optical disk 1; 18, an access control circuit that receives a comparison result of a target sector ID and detection sector ID from a system controller, and in response thereto controls a RAM control circuit 19 so that it begins writing of demodulated data into a RAM; 19, a RAM control circuit for controlling and executing writing of latched demodulation data into the RAM.

One exemplary sector structure which is a minimal processing segment or "unit" of digital signals recorded on the optical disk 1 will be explained with reference to FIG. 5. Also, one example of the structure of a sync pattern will be explained in conjunction with FIG. 6.

As shown in FIG. 5, a single data sector 5D which is one data unit prior to modulation is designed so that 172 bytes× 12 data are regarded as a unit, which contains therein a sector ID (4 bytes) of 5B being added to every data sector for indication of a physical address on the disk, a sector ID correction code (2 bytes) of 5C, main data 1–12, and additive data.

A correction block 5A which consists essentially of a plurality of data sectors and is a minimal segment or "unit" for error correction is such that a PI correction code of 5E for effectuation of correction with respect to data in a row direction and a PO correction code of 5F for execution of correction with respect to sector data in a column direction after alignment of sixteen data sectors which act as one unit of error correction are used to constitute a single correction block 5A.

Prior to recording on a disk the digital data arranged as described above, interleave processing is effected within a correction block in units of rows; thereafter, the so-called "8–16" modulation processing for modulating data with 1 byte (8 bits) as a unit into 16 bits with respect to each data sector unit is performed along with addition of a sync pattern thereto to thereby record on the disk the resulting data with one recording sector configured as shown by 5G in FIG. 5 being as a unit. The modulated data is added with 32-bit sync patterns (SY0–SY7) with 1,456 bits as a unit to thereby constitute a single sync frame; thereafter, resultant data is then "marked" as an array of recording pits of serial data form in the sequence of sync frames including SY5, SY1, SY5, SY2, . . . with a specific sync frame containing SY0 located at the top thereof.

Figure 6:
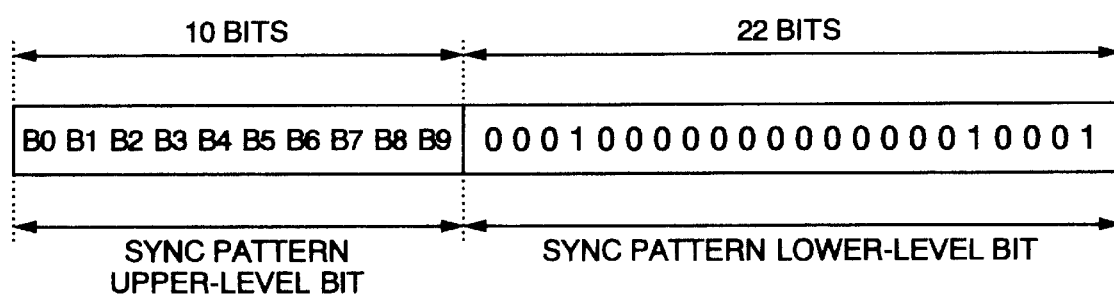
FIG. 6 is an explanatory diagram showing a configuration of a sync pattern contained in the recording sectors of FIG. 5.

As shown in FIG. 6, a configuration of such sync patterns included in this one recording sector is such that it is composed of 22 bits of sync pattern lower-level bits common over SY0–SY7, and 10 bits of sync pattern upper-level bits (B0–B9) indicative of the type code of a sync pattern.

Turning back to FIG. 1, the recording pits marked on the optical disk 1 are read by the pickup 2 and then transferred as bit data of 1-bit serial form. At the read channel circuit 3, after production of bit clocks of the period f as synchronized with the bit data; thereafter, serial-to-parallel conversion is effected with respect to the bit data thus outputting read data 0, 1 along with read clocks of (2×f) period synchronized therewith. The read data 0, 1 and read clocks are passed to the phase adjuster circuit 4, which lets data pulses be in phase with clock pulses for transmission to the shift registers A5, B6.

Figure 2:
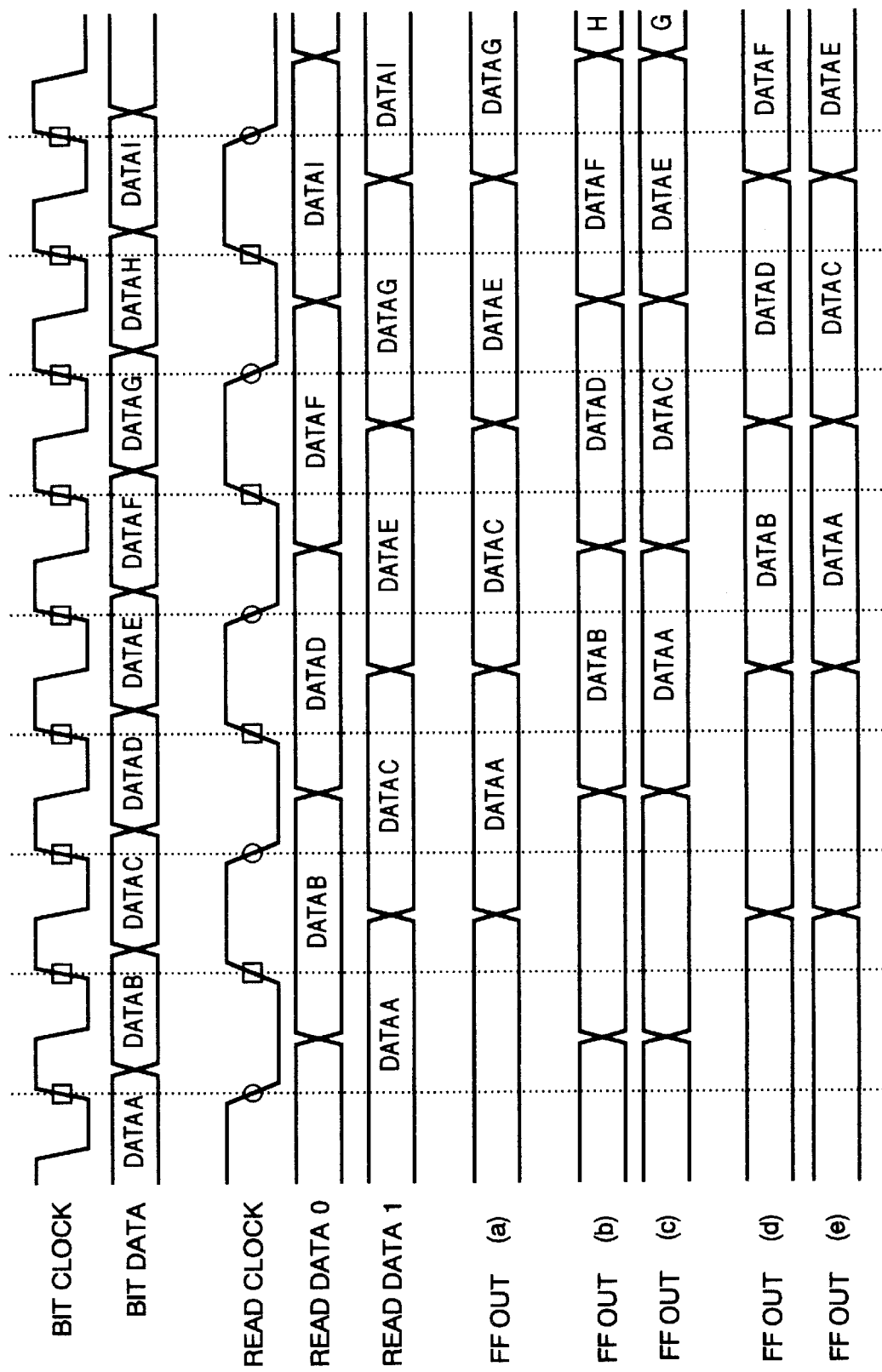
FIG. 2 is a timing diagram showing one exemplary scheme for transferring read data 0, 1.
Figure 3:
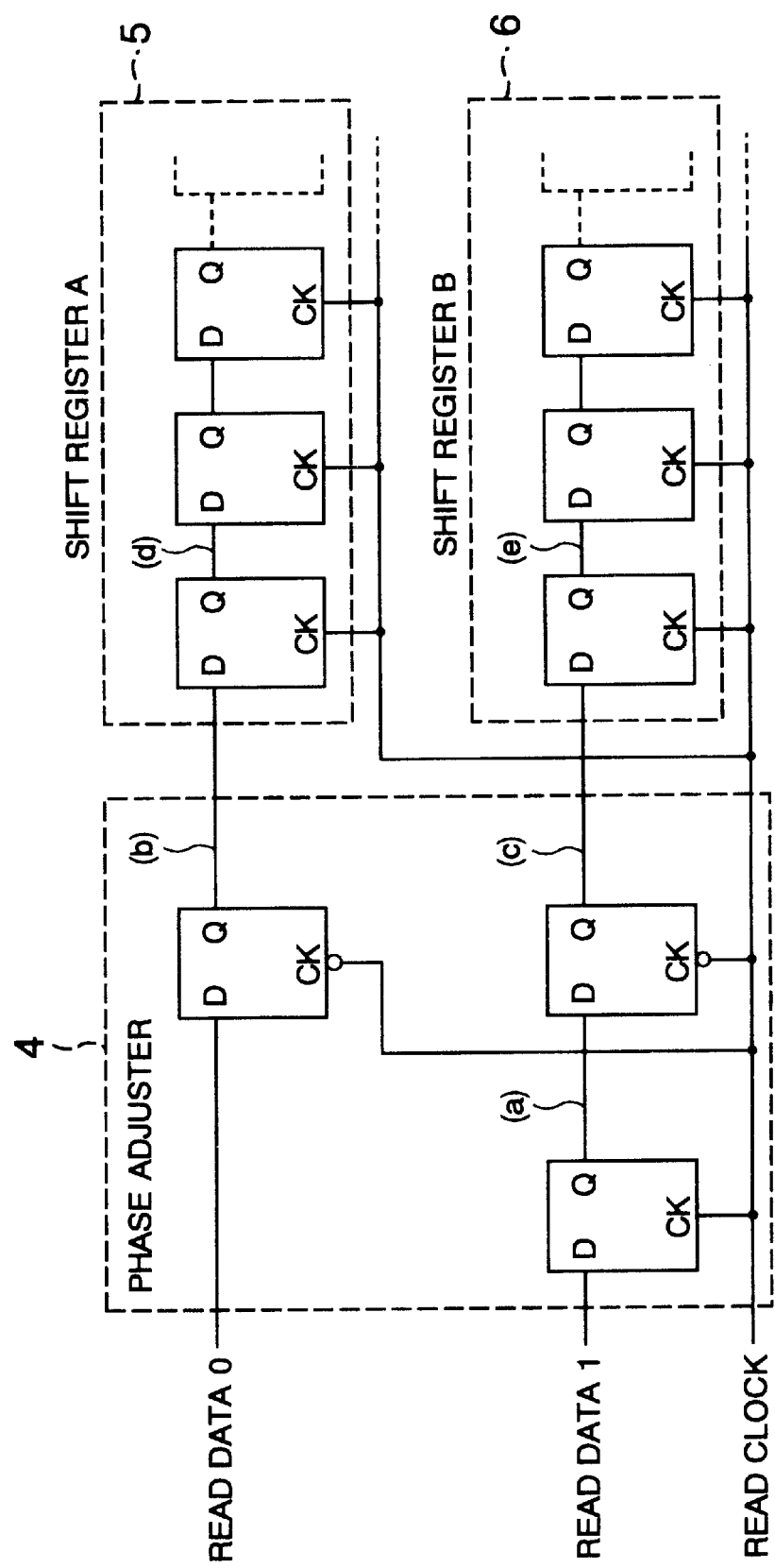
FIG. 3 is a block diagram showing one example of a configuration of a phase adjusting circuit and of shift registers "A" and "B" used in the first embodiment of the invention.

Here, one example of a relation in timing of the read data 0, 1 versus the read clocks is depicted in FIG. 2 along with one example of the timing at the phase adjuster circuit 4, whereas an exemplary configuration of the phase adjuster circuit 4 is shown in FIG. 3.

In FIG. 2, serial-to-parallel conversion is done with respect to the bit data read out of the disk and then digitized as well as to the bit clocks of period f thereby obtaining read data 0, 1 and read clocks of period (2×f). The read data 0 is output from the read channel circuit 3 synchronously with the falling edge of a read clock whereas the read data 1 is output therefrom in synchronism with the rising edge of read clock. A timing during the process of phase adjustment between the read data 0, 1 and read clocks is shown in FIGS. 2(a) to 2(e), which may correspond to flip-flop (FF) outputs (a) to (e) in FIG. 3 that shows one example of internal configurations of the phase adjuster circuit 4 and shift registers A5, B6.

In the phase adjuster circuit 4 of FIG. 3, it operates to allow the read data 0 to pass through a flip-flop at a timing of the falling edge of a read clock (FF output (b) of FIG. 3) while causing the read data 1 to pass through a flip-flop at the rising edge of a read clock (FF output (a) of FIG. 3) in the phase adjuster circuit 4. Next, for the FF output (a) of FIG. 3, let it pass through a flip-flop at a timing of the falling edge of a read clock (FF output(c) of FIG. 2). As a result, the read data 0, 1 from the read channel circuit are synchronous with the falling edges of read clocks and thus are in phase with each other. At the timings of FF outputs (b) and (c) of FIG. 3, these are transferred to the shift registers A5, B6, respectively; at the shift registers A5, B6, data acquisition is done synchronously with the rising edge of a read clock, thereby performing data shifting with respect to the read data 0, 1 (FF outputs (d), (e) of FIG. 3).

In FIG. 1, 2-bit read data being output from the phase adjuster circuit 4 are subject at the shift registers A5, B6 to shift processing in synchronism with read clocks for decoding lower 22 bits of a sync pattern based on the data streams being stored in the shift registers A5, B6.

However, it remains unknown at this time point which one of the shift registers presently stores therein the top bit (B0 of FIG. 6) of lower part of the sync pattern stored in shift registers A5, B6. An explanation will now be given with reference to FIG. 4, of the way how the sync pattern with the above-mentioned structure shown in FIG. 6 is stored in the shift registers A5, B6, and also the way how the sync pattern is to be decoded, along with the way of successively transferring the demodulated data stored in the shift registers A5, B6 after the sync pattern.

In FIG. 4, the shift register A is of 18 bits whereas shift register B is 17 bits, by way of example, with shift-register numbers of from 0 up to 34 are adhered to respective bits of each shift register. A sync pattern being stored in the shift registers A, B is subdivided into a data transfer state (4-1) in which the top bit B0 is sent forth toward the shift register A, and a data transfer state (4-2) for transmission of the top B0 to shift register B.

In the data transfer state (4-1), the decoding range of the sync pattern's lower bit part is from 1 to 22, whist the decode range of the sync pattern's upper bit part is from 25 to 34 in the case a single clock of the read clock is required for decoding of such lower bit pattern. In addition, the demodulated data to be successively stored after the sync pattern is such that 16-bit data (D0–Df) for demodulation processing and certain data bits of the zeroth and the twelfth of 16 bits of the next demodulated data necessary for demodulation rules, for example, are stored in a shift register. After elapse of 15 clocks since completion of storage of the sync pattern's lower bits, data demodulation is effected with respect to those bits having the register numbers 15 to 30, wherein data being stored at locations of the register numbers 14 and 2 required for the demodulation rules will be used during the next succeeding data demodulation. The following data demodulation is performed each time 8 clock data shift is done.

In the data transfer state (4-2), the decoding range of the sync pattern's lower bit part is from the register number 0 to number 21, whereas the decode range of the sync pattern's upper bit part is likewise from register number 24 to 33, which numbers are one-clock delayed ones. Also note that 15 clocks are required for the data necessary for the intended data demodulation (D0–Df plus the 0th and 12th bits of the next demodulated data) to be stored in a shift register, wherein data demodulation is effected with respect to those bits in the range of the register numbers 14 to 29 while the data to be stored at the register numbers 13 and 1 will be used during the next data demodulation. The succeeding data demodulation will be carried out every time the 8-clock shifting is done.

In the way stated above, in the case of performing detection of sync patterns being contained for transmission in the read data 0, 1, two different kinds of data transmission states coexist; in accordance with such coexistence, the use of sync pattern decoders different in decode bit of shift registers from each other is required, which in turn makes it necessary to effect bit selection of shift registers in correspondence to a present transfer state upon execution of upper-level sync pattern's decoding and data demodulation.

The decode bits of a shift register connected to the sync pattern low-level decoder A7 in FIG. 1 fall within a range of from the register number 1 to register number 22, which is for decoding the lower-level pattern in the data transfer state (4-1). The decode bits of a shift register connected to the sync pattern low-level decoder B8 are within a range of the register number 0 to number 21, which is for decoding the lower-level pattern in the data transfer state (4-2).

At the sync pattern low-level decoders A7, B8, decoding of the sync pattern's lower 22 bits is simultaneously carried out with respect to the data presently being stored in the shift registers A7, B8; at the sync detection determinator circuit 9, judgment of sync pattern detection is made using the decode output of each of the decoders A7, B8 and a sync detection window as generated by the window generator circuit 10. The circuit is also responsive to reception of such two decode outputs, for determining the data transfer state (4-1) or (4-2) and for determining the sync pattern's upper-level decode bits and data's demodulated bits with respect to the shift register concerned.

The latch timing generator circuit 11, in accordance with the sync pattern detection determination or "judgment," generates a latch timing of the demodulated data for compliance with the data transfer states (4-1) and (4-2). The upper decode bit selector circuit 13 selects a decode range of upper-level bits according to the selection judgment of decode bits, and then outputs the selected bits to the sync pattern upper-level decoder 14. The sync pattern upper-level decoder 14 performs decoding of the upper bits B0–B9 then outputting the sync pattern codes (SY0–SY7).

The demodulation data bit selector circuit 12 is also operatively responsive to the demodulation bit selection judgment, for selecting a range of demodulation bits and those bits necessary for the next data demodulation to thereby output the selected bits toward the data demodulator circuit 15. The data demodulator circuit 15 operates to execute demodulation processing in accordance with the selected bits while allowing the demodulated data to be latched in the data latch 16 at a latch timing.

The sync pattern codes (SY0–SY7) as output from the sync pattern upper-level decoder 14 are decoded such that the SY0 indicating the top of a recording sector is first decoded and thereafter SY5, SY1, . . . , SY4, SY7 are successively decoded and output in this order. At the window generator circuit 10, where codes are detected in the order of SY3, SY7, SY4 and SY7 by way of example, the next possible sync pattern must be SY0; in this case, the circuit 10 generates a window for use in detecting SY0. When this SY0-detecting window is generated, the sync pattern detection determinator circuit 9 lets the sector ID detector circuit 17 detect a sector ID being added immediately after the SY0 if any lower bit of the sync pattern is detected within such window.

The detected sector ID is compared at the access control circuit 18 with a target sector ID that may be designated by an associated microcomputer or the like; if a match of the sector ID is found then the RAM control circuit 19 operates to initiate writing of demodulated data into a RAM. Simultaneously, generation of a RAM address is also done in dependence on a decode result of the sync pattern codes.

As has been stated above, in the first embodiment, it becomes possible, in the case of detecting more than one sync pattern contained for transmission in the 2-bit read data 0, 1, to correctly perform the intended sync pattern detection even when it is uncertain that the top bit B0 of a sync pattern is sent from which one of the 2-bit data. This in turn makes it possible to effect correct data demodulation with respect to data being successively transferred after such sync pattern. In addition, since selection of the demodulated data's register bit(s) and updating the latch timing are effectuated every time the sync pattern detection is made, it is possible even when the top bit B0 can deviate during data transmission to newly perform detection of a sync pattern, which in turn enables successful achievement of correct data demodulation.

In the first embodiment stated above, assuming that the period of a bit clock synchronized with bit data of 1-bit serial form being read out of a disk is f, the 2-bit read data 0, 1 may be transferred synchronously with the read clocks of the period (2×f) to be then input to the phase adjuster circuit 4. Detection of sync patterns is done in such a manner that one is detected upon every elapse of 744 clock pulses of the read clocks that are necessary for transmission of one sync frame (32+1,456) bits as shown in FIG. 5 while the data demodulation employs a specified scheme for demodulating 16 bits into 8 bits; hence, one demodulated data is obtainable each time 8 read clocks take place, which data will then be transferred to the RAM.

More specifically, in the case a minimal amount or "unit" of data transfer toward the RAM is 8 bits per transfer event, a relation of the number of read clocks of period (2×f) indicative of the data transfer amount per unit time toward the data demodulator circuit 15 versus the demodulation data's transfer number per unit time representative of the data transfer amount to the RAM may be defined as 8:1. Additionally, the number of read clocks having the period of (2×f) which may represent the data transfer amount per unit time toward the data demodulator circuit 15 versus the transfer number per unit time from the RAM which indicates a data transfer amount when reading is done with respect to the main data in a single data sector written into the RAM is such that the from-the-RAM data transfer unit is 8 bits per transmission: supposing that the amount of redundant data other than the main data such as error correction codes and the like is less than or equal to 50 percent of the whole data amount, the relation may fall within a range of 8:1 to 16:1.

On the contrary, if an attempt is made to detect and demodulate sync patterns without modifying any one of the 1-bit serial data as read from a disk and bit blocks of period f synchronized therewith, then the resulting sync pattern detection is such that one is detected every time 1,488 clocks of the bit clocks occur as required for the 1-period frame transmission, while at the same time obtaining a single demodulated data after elapse of 16 bit clocks, which data will then be transferred to the RAM. In other words, a relation of the bit clocks of period f per unit time versus the number of demodulated data transmission to the RAM is given as 16:1 under the same condition as that stated supra, whist a relation with the amount of main data transmission from the RAM is within a range of 16:1 to 32:1.

Thus, in the case the circuitry for performing digital signal processing operations which is at the stage following the phase adjuster circuit is integrated on a semiconductor chip substrate as one application example of the first embodiment, it becomes possible to achieve sync pattern detection and data demodulation processing with the clock period of (2×f) established therein, which may in turn enable suppression of any possible increase of power dissipation in such semiconductor chip as a whole while simultaneously letting the data transfer rate be well maintained.

FIG. 7 depicts in a block form a configuration of the digital signal processor circuit in accordance with a second embodiment of the present invention; in this drawing, the same reference numerals and characters are used to designate the same or equivalent parts or components used in the first embodiment of FIG. 1, and an explanation thereof will be eliminated herein for purposes of elimination of a duplicative description.

In FIG. 7, the read channel circuit 3 is designed to generate bit clocks of the period f synchronized with data through a PLL with respect to 1-bit serial data as read by the pickup 2 from the optical disk or disc 1 which records thereon data of the format stated previously, and then perform serial-to-parallel conversion for such serial data to thereby output 4-bit read data "0," "1," "2" and "3", along with read clocks of period (4×f). Numeral 20 designates a shift register "C" that performs data shifting with respect to the read data 2 after having completed phase adjustment between the read data 0–3 and read clocks; 28 indicates a shift register "D" for effectuating data shifting with respect to the read data 3; 21 is a sync pattern low-level decoder C; 29, a sync pattern low-level decoder D.

In FIG. 7, recording pits marked in the surface of optical disk 1 are read by the pickup 2 for transmission as certain bit data of 1-bit serial form. In the read channel circuit 3, after generation of bit clocks of period f being synchronized with the bit data, the circuit performs serial-parallel conversion, then outputting 4-bit read data 0, 1, 2, 3 and read clocks of period (4×f) that are synchronous with them. The resultant read data 0, 1, 2, 3 and read clocks are passed to the phase matching circuit 4, letting data pulses and clock pulses be in phase with each other, which are then sent forth toward the shift registers A5, B6, C20, D28.

It is however uncertain at this time instant which one of the shift registers presently stores therein the top bit (B0 of FIG. 6) of a sync pattern being transferred to the shift registers A, B, C, D. An explanation will now be given, with reference to FIGS. 8 and 9, of how the sync pattern with the prescribed structure shown in FIG. 6 is stored in the shift registers A, B, C, D and how decoding of such sync pattern is carried out along with a way of transmission of demodulated data to be stored in the shift registers A, B, C, D in succession after the demodulated data.

Figure 9A:
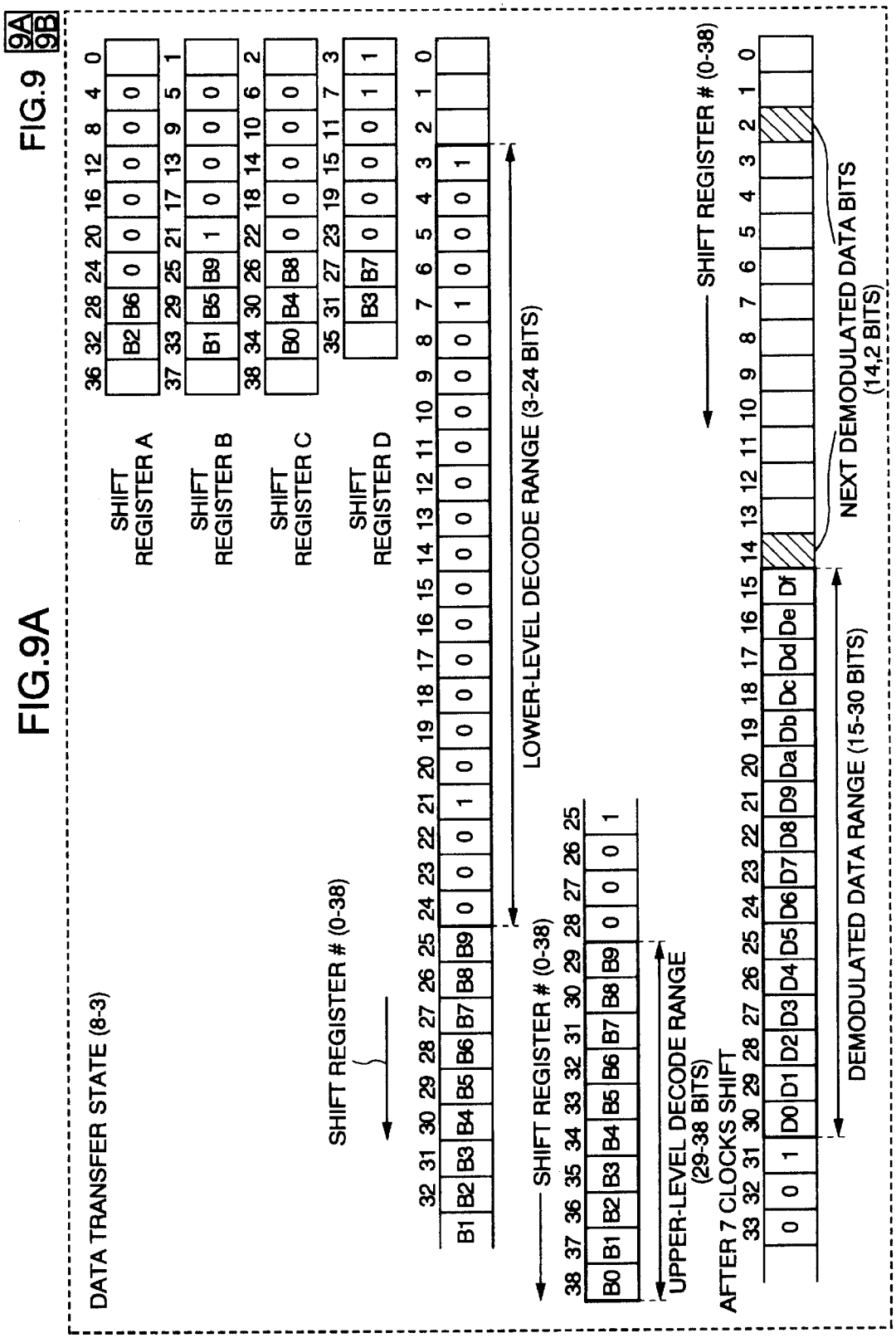

In FIGS. 8 and 9, the shift registers A5, B6, C20 are arranged in a 10-bit configuration whereas the shift register D28 is 9 bits, wherein respective bits of each shift register are adhered with shift register numbers of 0 up to 38. A sync pattern to be stored in the shift registers A, B, C, D may take four states (cases) which follow: a data transfer state (8-1) that causes the top bit B0 of such sync pattern being transferred toward the shift register A5, a data transfer state (8-2) for transmission to the shift register B6, a data transfer state (8-3) for transmission to the shift register C20, and a data transfer state (8-4) for transmission to the shift register D28.

In the data transfer state (8-1), the decode range of sync pattern's lower part falls within a range of from the register number 1 to number 22, whist the decode range of the sync pattern's upper part is within a range of the register number 27 to number 36 when a single read clock is required for decoding of the low-level bit pattern. Also, the demodulated data being successively stored after the sync pattern is such that 16-bit data for demodulation processing is stored in a shift register along with the zeroth and twelfth data bits of 16 bits of the next demodulated data, by way of example, which are necessary for data demodulation rules. After elapse of 7 clock pulses since completion of storage of the sync pattern low-level bits, data demodulation is performed with respect to the bits having the register numbers 13 to 28, wherein the data required for demodulation rules being stored at locations of the register numbers 12 and 0 may be used during demodulation of the next data. Thereafter, the following data demodulation will be effected every time 4-clock data shifting is done.

In the data transfer state (8-2), the decode range of sync pattern's lower part is within a range of the register number 2 to number 23, whereas the decode range of sync pattern's upper part falls within a range of the register numbers 28 to 37. Note that elapse of 7 clocks is required for the data necessary for data demodulation to be stored in a shift register, wherein data demodulation is carried out with respect to those bits falling within the range of register numbers 14 to 29 while the data necessary for demodulation rules being stored at the register numbers 13 and 1 will be used during demodulation of the next data. The data demodulation to be effected thereafter will be performed every time 4-clock shifting is done.

In the data transfer state (8-3), the decode range of sync pattern's lower part covers from the resister number 3 up to number 24, whereas the decode range of sync pattern's upper part is within a range of the register numbers 29 to 38 which range is likewise a one-clock delayed one. Elapse of 7 clocks is required for the data necessary for data demodulation to be stored in a shift register, wherein data demodulation is performed with respect to those bits falling within the range of register numbers 15 to 30, while the data necessary for demodulation rules being stored at the register numbers 14 and 2 will be used during demodulation of the next data. The subsequent data demodulation will be effectuated each time 4-clock shifting is completed.

In the data transfer state (8-4), the decode range of sync pattern's upper part falls within a range of register numbers 0 to 21, whist the decode range of sync pattern's upper bits ranges from the register number 26 to number 35 in a similarly one-clock delayed manner. It is required that 8 clocks elapse until the data necessary for data demodulation is stored in a shift register, wherein the data demodulation is carried out for those bits in the range of the register numbers 16 to 31, while the data necessary for demodulation rules being stored at the register numbers 15 and 3 will be used during demodulation of the next data. The subsequent data demodulation will be performed every time 4-clock shifting is done.

As stated above, in the case of performing detection of more than one sync pattern contained in the read data 0, 1, four different data transfer states are available; in accordance with the presence of these states, those decoders of sync pattern lower part are required which are different in decode bit thereof. During decoding of the upper-level sync pattern and data demodulation, bit selection of shift register is required in accordance with the transfer state. Further, in view of the fact that the number of read clocks required within a time interval spanning from storage of the sync pattern's lower bits in a shift register to storage of demodulated data becomes different depending on a presently established data transfer state, it should be required that generation of the latch timing of demodulated data be adjusted that reflects such difference in clock number.

The decode bits of a shift register connected to the sync pattern low-level decoder A7 in FIG. 7 range from the register number 1 to number 22, for execution of decoding of low-level pattern in the data transfer state (8-1). The decode bits of a shift register connected to the sync pattern low-level decoder B8 are in a range of from the register number 2 to number 23, for low-level pattern decoding in the data transfer state (8-2). The decode bits of a shift register connected to the sync pattern low-level decoder C21 fall within a range of the register number 3 to number 24 for lower pattern decoding in the data transfer state (8-3). The decode bits of a shift register connected to the sync pattern low-level decoder D29 are within a range of the register numbers 0 to 21 for low-level pattern decoding in the data transfer state (8-4).

For the data stored in the shift registers A5, B6, C20, D26, decoding operations of sync pattern's low-level 22 bits are carried out simultaneously at the sync pattern low-level decoders A7, B8, C21, D29; the sync detection determinating circuit 9 is operable to determine or "judge" detection of a sync pattern on the basis of respective decode outputs and a sync detection window(s) as generated by the window generator circuit 10. In addition, the data transfer states (8-1) to (8-4) are judged from four decode outputs, and also judge selection of sync pattern upper-level decode bits and data's demodulation bits with respect to the shift register(s) is judged.

In accordance with the judgment of such sync pattern detection, the latch timing generator circuit 11 generates and issues a latch timing signal of demodulated data which complies with the data transfer states (8-1) to (8-4). In accordance with the decode bit selection judgment, the upper-level decode bit selector circuit 13 selects an appropriate decode range of upper-level bits and outputs the selected bits to the sync pattern upper-level decoder 14. The sync pattern upper-level decoder 14 performs decoding of sync pattern upper bits B0–B9 outputting sync pattern codes (SY0–SY7).

The demodulation data bit selector circuit 12 is also responsive to receipt of the demodulated bit selection judgment, for selecting a range of demodulated bits along with those bits necessary for demodulation of the next bits, and then outputting such selected bits to the data demodulator circuit 15. Upon receipt of the demodulated data bits thus selected, the data demodulator circuit 15 executes demodulation processing while causing the demodulated data to be latched in the data latch circuit 16 at the latch timing.

The second embodiment is similar to the first embodiment in operation to be later performed, including but not limited to generation of a window for use in detecting SY0, detecting a sector ID, getting access to a target sector(s), and controlling the RAM.

As stated above, in the second illustrative embodiment, when detecting a sync pattern being contained in 4-bit read data 0, 1, 2, 3 for transmission, the intended sync pattern detection may be effected correctly even where it remains uncertain that the top bit B0 of a sync pattern is sent forth from which one of the bits of such 4-bit data. This in turn enables achievement of correct data demodulation with respect to the data being successively transferred after the sync pattern detected. Furthermore, effectuating selection of demodulated data's register bits and updating the latch timing upon detection of every sync pattern make it possible to newly perform detection of a sync pattern even where the top bit of a sync pattern deviates during data transmission thereby enabling accomplishment of correct data demodulation.

Supposing in the second embodiment that the period of bit clocks is f which are synchronized with the bit data of 1-bit serial form as read out of a disk, 4-bit read data which may take the values 0, 1, 2, 3 are transferred in synchronism with read clocks having a period of (4×f) for input to the phase adjuster circuit 4. Since the sync pattern detection is effected upon each elapse of 372 pulses of the read clocks necessary for transmission of (32+1,456) bits of one period frame as discussed previously in conjunction with FIG. 5 while the data demodulation is of the scheme for demodulating 16-bit data into 8-bit data, a single demodulated data item may be obtained every time four read clocks take place for transmission to the RAM.

More specifically, a relation of the number of read clocks having the period of (4×f) which indicates the data transfer amount toward the data demodulator circuit 15 per unit time versus the demodulated data transfer number per unit time representative of the data transfer amount to the RAM is defined by 4:1 in the case the minimum amount of data transfer to the RAM is 8 bits per event. In addition, a relation of the number of read clocks of period (4×f) indicating the data transfer amount to the data demodulator circuit 15 per unit time versus the transfer number per unit time representing a data transfer amount when performing reading with respect to the main data in one data sector written into the RAM may range from "4:1" to "8:1" under the assumption that the unit of data transfer from the RAM is 8 bits per event and that the amount of redundant data excluding the main data, such as error correction codes and the like, is less than or equal to 80% of the total data amount.

In contrast, if an attempt is made to perform sync pattern detection and demodulation without modification of 1-bit serial data read from a disk and associated bit clocks of period f, then a sync pattern is detected upon every elapse of 1,488 pulses of the bit clocks necessary for transmission of one period frame while letting a single demodulated data item be obtained and sent forth to the RAM every time 16 bit clocks occur. In other words, a relation of the number of bit clocks with the period f per unit time versus the number of demodulated data transfer to the RAM is given by 16:1 in the same way as in the condition stated supra, whist a relation with the amount of main data transferred from the RAM is defined falling within a range of from "16:1" to "32:1."

Accordingly, in the case the circuitry for digital signal processing which follows the phase adjuster circuit is integrated on a semiconductor chip as one application of the second embodiment, it becomes possible to further suppress an increase in power dissipation of such semiconductor chip as a whole while retaining the data transfer rate. This can be said because it is possible to perform the intended sync pattern detection and data demodulation with the clock period of (4×f).

FIG. 10 is a block diagram showing a configuration of a digital signal processor circuit in accordance with a third embodiment of the invention, wherein the same reference characters are used to denote the same or equivalent components used in the first embodiment of FIG. 1, and an explanation thereof will be eliminated herein for purposes of elimination of a duplicative description.

In FIG. 10, numeral 1 designates a data-rewritable optical disk; 22 denotes an address mark (AM) pattern decoder "A" which is for performing decoding of an AM pattern representative of the top of physical addresses as pre-marked on the optical disk 1; 23 is an AM pattern decoder "B" for decoding of an AM pattern in a similar way; 24, a pre-sync (PS) pattern decoder "A" for decoding a PS pattern indicative of the top of recording sectors in a data-rewritable recording region on the optical disk 1; 25, a PS pattern decoder "B" for likewise decoding a PS pattern.

An explanation will now be given of the structure of a sector with reference to FIG. 11, which sector acts as a minimal processing zone or "unit" of digital signals being stored on the rewritable optical disk 1.

Figure 11:
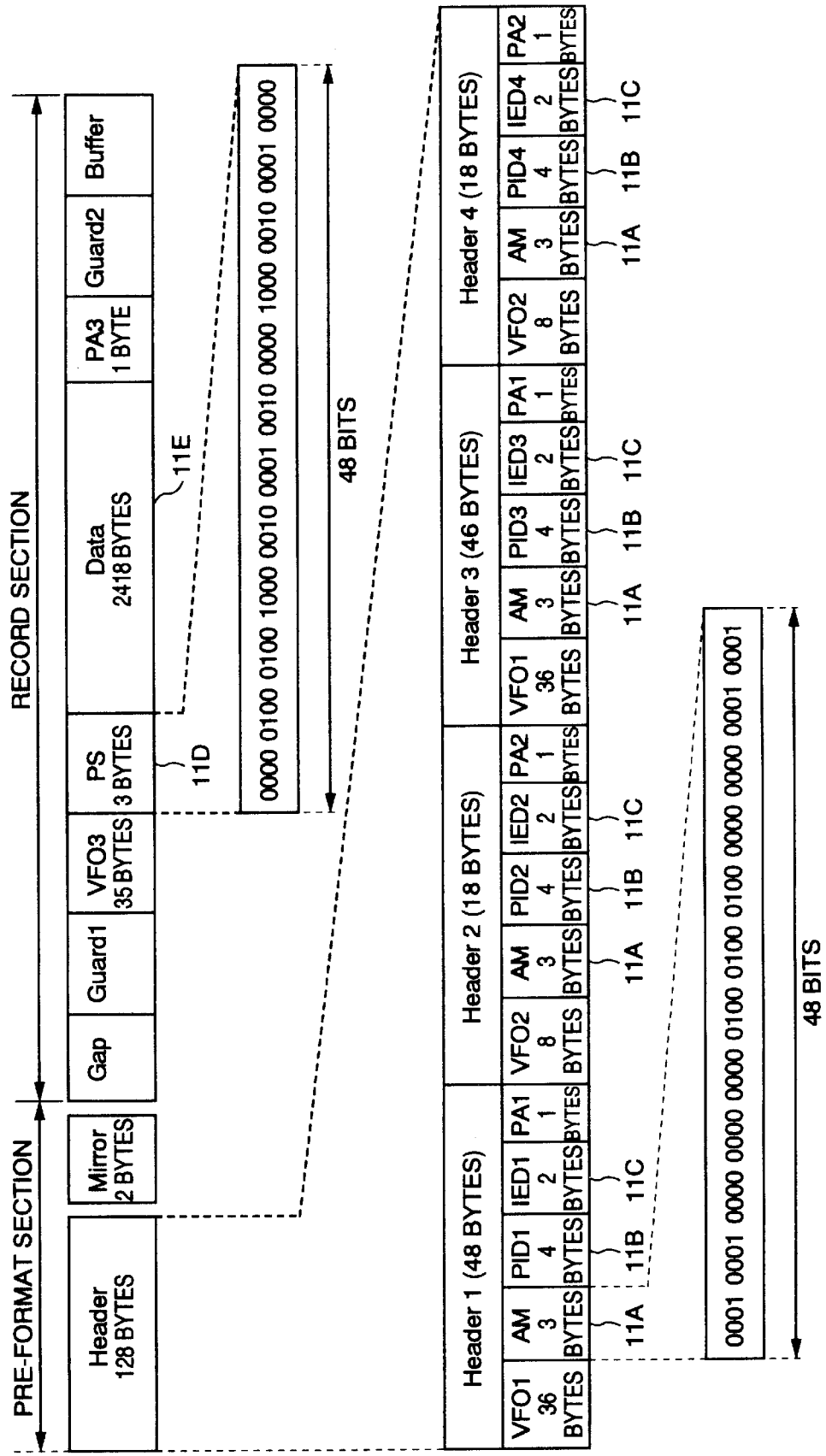
FIG. 11 is a diagram showing an exemplary structure of sectors recorded on an optical disk as applied to the third embodiment of the invention.

As shown in FIG. 11, a sector for use as the minimum area for recording data on the optical disk 1 is generally split into a pre-format part (including a header and a mirror field) as prerecorded on the disk, and a data rewritable recording part, wherein the header in the preformat part may consist of four header subparts with the numbers 1 to 4 adhered thereto.

An internal structure of the headers 1 to 4 may include a VFO1 (36 bytes) and VFO2 (8 bytes) which record therein progressive repeat patterns for use in causing a signal read out of the disk to track a PLL even when the disk rotation number deviates, address mark (AM) 11A of 48 bits (3 bytes) for use in recording a pattern indicative of the top of physical addresses on the disk, PIDs 1–4 (4 bytes) of 11B recording therein physical addresses on the disk, IEDs 1–4 (2 bytes) of 11C used for error correction with respect to PIDs, and postambles (PAs) 1, 2 (1 byte) for use in matching demodulation rules during demodulation of PID and IED data.

The recording field is configured including a null area called the "gap" for protection of a written-data storage region, guard areas (guards 1, 2), a buffer region, a VFO 3 for use in causing a signal read from the disk in the record field to keep track of the PLL, a pre-sync (PS) 11D of 48 bits (3 bytes) which indicates the top of data recording regions, a data field 11E of 2,418 bytes in which the one recording sector stated supra with reference to FIG. 5 is directly recorded, and a postamble (PA) 3 of 1 byte used for matching demodulation rules with respect to demodulation data being recorded at the final location or "tail" of data record sections.

In FIG. 10, a playback signal as read by the pickup 2 from the optical disk 1 is transferred as bit data of 1-bit serial form. As in the first embodiment, the read channel circuit 3 operates to generate bit clocks having the period f as synchronized with the bit data; thereafter, this circuit performs serial-parallel conversion for the bit data and then outputs resultant read data 0, 1 along with read clocks with the period of (2×f) synchronously therewith. The read data 0, 1 and read clocks are routed to the phase adjuster circuit 4 which lets them be in phase with each other. After such phase adjustment, the resulting data and clocks are sent forth to the shift registers A5, B6 for data shifting with respect to the read data 0, 1 synchronized to the read clocks, thereby to perform decoding of a sync pattern's lower part using a data stream being presently stored in the shift registers A5, B6.

In the third embodiment the shift register A5 is formed of 25 bits whereas the shift register B6 is of 24 bits with shift register numbers 0 to 48 being added thereto, by way of example. This is in view of the fact that two different data transfer states are present due to the use of 2-bit read data and that the maximum bit length of a specific pattern contained in the data being transferred for use in effecting detection is 48 bits as in the AM or PS pattern.

In regard to the data transfer state, this may be divided into two different data transfer states: one of them is such that decoding is carried out in a range of the register numbers 1 to 48 with respect to the PS pattern, in a range of register numbers 1 to 22 for the sync pattern's lower bits, in a range of register numbers 25 to 34 for the sync pattern's upper-level bits whereas, during data demodulation, the intended demodulation is effected for the data in a range of the register numbers 15 to 30 and also for data at the register numbers 14, 2; and, the other is such that decoding is done in a range of register numbers 0 to 47 with respect to the AM pattern and PS pattern and in a range of register numbers 0 to 21 for the sync pattern's lower bits as well as in a range of register numbers 24 to 33 for the sync pattern's upper bits, whist, during data demodulation, demodulation is done for the data in a range of register numbers 14 to 29 and also for data at the register numbers 13, 1.

In FIG. 10, the decoding range of the shift registers A, B connected to the AM pattern decoder A22 and PS pattern decoder A24 is a range of from the register number 1 up to number 48 whereas the decode range of a shift register connected to the sync pattern low-level decoder A7 is from register number 1 to 22, wherein the top bit of each pattern to be detected is for use in performing decoding of each pattern in the data transfer state permitting data transmission from the shift register A5. The decoding range of the shift registers A, B connected to the AM pattern decoder B23 and PS pattern decoder B25 is from the register number 0 to register number 47 whereas the decode range of a shift register connected to the sync pattern low-level decoder B8 is from register number 0 to 21, wherein the top bit of each pattern under detection is used for decoding each pattern in the data transfer state permitting data transmission from the shift register B6.

Upon completion of reproduction of the preformat section and then transmission of an AM pattern to the shift registers A5, B6, decoding is performed at the AM pattern decoders A22, B23 in a parallel fashion, letting the AM detection determinator circuit 26 judge detection of an AM pattern. It also judges based on two decode outputs a presently established data transfer state, and further judges selection of demodulation bits for use in performing data demodulation with respect to the physical ID (PID) and correction code (IED) which are sent to the shift register it follows the AM pattern.

The latch timing generator circuit 11 generates and issues a signal that defines the latching timing of demodulated data in conformity with the data transfer state presently being established. The demodulation data bit selector circuit 12 selects one or more shift-register bits in accordance with the demodulation bit selection judgment to thereby output those selected bits to the data demodulator circuit 15.

At the data demodulator circuit 15, this executes demodulation processing with respect to the selected register bits thereby allowing resultant demodulated data to be latched in the data latch 16 at the latch timing. The sector ID detector circuit 17 is operatively responsive to receipt of the judgment of AM pattern detection, for performing physical ID detection and error correction for the data thus demodulated and latched. Thereafter, the AM pattern is transferred for three times: in each transfer event, AM pattern decoding is carried out on a parallel processing manner thus allowing data demodulation bit selection and latch timing updating as well as physical ID detection plus error correction with respect to the physical ID and IED every time pattern detection is done.

Upon initiation of reproduction of the recording section after having played back the preformat section, a PS pattern representative of the top of recorded data at the shift registers A5, B6 is transferred; then, decoding is performed at the PS pattern decoders A24, B25 in a parallel fashion to provide decode results, based on which the PS detection determinator circuit 27 attempts to determine or "judge" detection of a PS pattern.

Here, an explanation will be given of the process of PS pattern decoding to be performed in a respective one of the PS pattern decoders A24, B26 with reference to FIG. 12 below.

While the PS pattern consists of 48 bits in the same manner as in the AM pattern, the reliability of data reproduction remains lower than the AM pattern of the preformat section which has been pre-marked on the disk due to the fact that such is present in rewritable recording regions so that it will not always be expectable that all the bits of 48 bits are reproduced correctly. If the circuitry is so designed as to decode unconditionally the 48 bits with respect to this PS pattern consisting of multiple bits, then the detectability of PS pattern can decrease rendering the intended detection infeasible in the worst case, which can lead to an inability to achieve reproduction of record data following such PS pattern in succession in the worst case.

Figure 12:
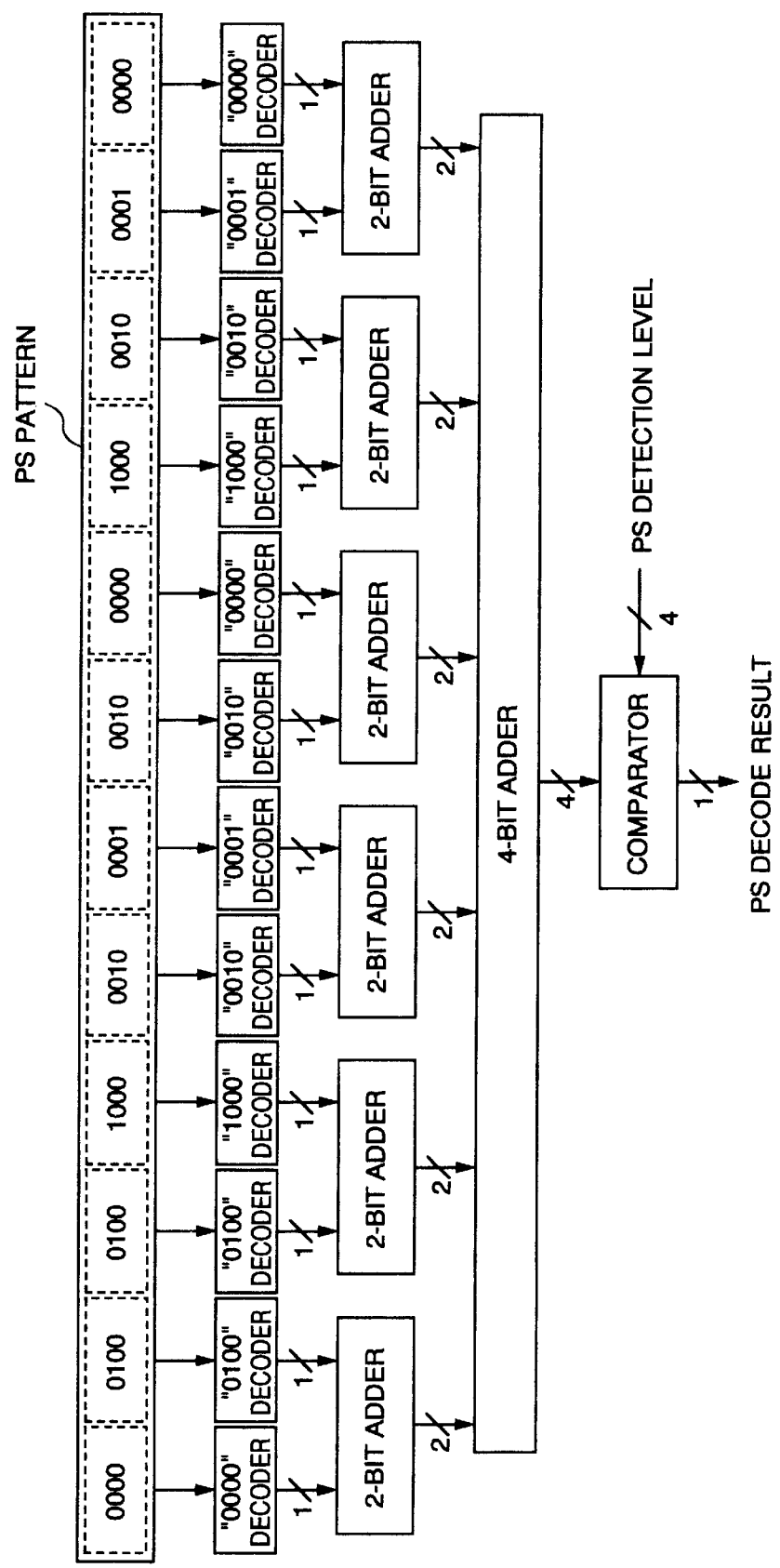
FIG. 12 is a diagram showing one example of a scheme for decoding a PS pattern in the third embodiment of the invention.

FIG. 12 depicts one exemplary configuration of the PS detection decoder employable in the illustrative embodiment, wherein a 48-bit PS pattern is divided into twelve portions with an exclusive-use decoder being provided for decoding four bits of each of such split portions. A 2-bit adder and 4-bit adder are used to perform a summing operation of each decode result thereby finally obtaining a 4-bit addition result. This result is passed to a comparator for comparison with a 4-bit PS detection level that may be set via a system controller or the like: if it is equal to or greater than the detection level, the comparator then judges that the PS pattern was detected and thereafter output a decode result. Alternatively, in FIG. 12, the 6 2-bit adders and one 4-bit adder described above can be substituted by 2, 3-bit adders and one 4-bit adder. If 24 2-bit decoders are provided in place of the 12 4-bit decoders for example, a 5-bit addition result is compared with a 5-bit PS detection level. With such PS pattern detection using the level setup, any possible deviation per disk may be absorbed increasing the reliability during disk reproduction.

In accordance with the PS pattern detection judgment available from the PS detection determinator circuit 27, the window generator circuit 10 operates to generate a window for detection of SY0 indicative of the top of record data. In addition, to ensure that the intended data demodulation remains executable even where the SY0 is undetected within a recording region that is less in data playback reliability, selection of a bit or bits being subject to the data demodulation at the PS detection time point is performed for initiation of generation of a latch timing of demodulated data.

Subsequently, the sync pattern low-level decoders A7, B8 decode lower 22 bits of a sync pattern in a parallel fashion; then, the sync detection determinator circuit 9 makes use of the decode results and the window generated through the PS detection to judge detection of the sync pattern SY0 at the top of one record sector, and newly judge the data transfer state from two decode results, and also newly performs demodulation bit selection and selection of upper-level bits of the sync pattern as well as generation of a latch timing of demodulated data.

Thereafter, selection of the upper-level bits of the demodulated data and sync pattern is carried out upon detecting of every sync pattern being sequentially transferred; the latch timing is also updated accordingly. In parallel to this processing, the following operation is performed: if it is judged at the access control circuit 18 that the detected physical ID is identical with the target ID to be accessed, then the demodulated data is written into the RAM under control of the RAM control circuit 19.

A significant advantage of the third embodiment is that when detecting the AM pattern and PS pattern plus sync pattern which are contained for transfer in the 2-bit read data 0 and 1, the individual one of such patterns may be correctly detected even where it is unknown that the top bit of each pattern is transferred from which bit of 2-bit data. This may in turn enable correct data demodulation with respect to those data successively being transferred after each pattern. Another advantage lies in capability to newly perform the pattern detection even when bit deviation occurs with respect to each pattern during data transmission, thereby enabling correct data demodulation. This can be said because the demodulation data bit selection and latch timing update are effected every time each pattern is detected.

In the third embodiment stated above, letting f represent the period of bit clocks synchronized with the data of 1-bit serial form as read from a disk, the 2-bit read data 0, 1 are sent in synchronism with the read clocks having the period of (2×f) and is then input to the phase adjuster circuit 4. A specific scheme is employed wherein detection of a sync pattern contained in the record data in a record region is such that one is detected every time 744 pulses of the read clocks necessary for transmission of a single sync frame (32+1,456) bits take place as has been described with reference to FIG. 5, and wherein the data demodulation is for demodulating 16-bit data into 8-bit data; thus, demodulated data is obtainable at an instant at which 8 pulses of the read clocks occur, and then is transferred to the RAM.

In other words, a relationship of the number of read clocks of period (2×f) indicating an amount of data transfer to the data demodulator circuit 15 per unit time versus the demodulated data transfer number per unit time representing an amount of data transfer to the RAM is given as "8:1" in the case the unit of data transfer to the RAM is 8 bits per unit time. In addition, a relation of the number of read clocks of period (2×f) indicative of the amount of data transfer to the data demodulator per unit time versus the number of transfer per unit time representative of a data transfer amount during reading with respect to the main data in record data as written into the RAM is defined so that it falls within a range of from "8:1" to "16:1" under the assumption that the unit of data transfer from the RAM is 8 bits per event and that the amount of redundant data other than the main data, such as error correction codes and the like, is less than or equal to 50% of the entire data amount.

If an attempt is made, by contrast, to perform detection and demodulation of a sync pattern using the unprocessed or "rare" 1-bit serial data read out of a disk and bit clocks of period f synchronized to the data without any processing applied thereto, the resulting sync pattern detection is such that a single pattern is detected upon occurrence of every union of 1,488 pulses of the read clocks necessary for transmission of one period frame, while a single demodulated data segment may be obtained at an elapse of 16 pulses of the bit clocks and then sent to the RAM. This is reworded in such a way that a relation of the number of bit clocks of period f per unit time versus the number of demodulation data transfer toward the RAM is represented as "16:1," whist a relation with the amount of data transfer from the RAM is defined so that it ranges from "16:1" to "32:1."

Consequently, it becomes possible to suppress any possible increase of power dissipation of the semiconductor chip as a whole while simultaneously retaining the data transfer rate because of the fact that the third embodiment is capable of performing, within the clock period of (2×f), detection of a respective one of the AM pattern and PS pattern plus sync pattern as well as data demodulation processing in the case the circuitry is integrated on a semiconductor chip, which circuitry is provided following the phase adjuster circuit and is used for execution of digital signal processing.

It should be noted that the bit number of the shift registers, the pattern decode bits, and the data bit(s) to be demodulated in the data transfer states shown in FIGS. 4, 8 and 9 should not exclusively be limited to those used in the embodiments stated above, and that the bit number of required shift registers, decode range, and data bits will be determined according to the length of a pattern being transferred within read data and demodulation rules used.

Note also that the decode range of the low-level pattern in the transfer state (4-2) of FIG. 4 and/or the transfer state (8-4) of FIG. 9 may be such that certain bit stream is decoded which comes after the depicted one by a single read clock.

Also note that a relation in phase between the read clocks and the read data being transferred from the read channel circuit should not be limited only to the form reduced to practice as stated previously; alternatively, it may be arranged so that all the read data of plural bits are transferred synchronously with the rising edges or falling edges of read clocks. One referable arrangement in this case is that such read data re temporarily passed to one or more flip-flops to set data which will then be transferred to a shift register. Further, even where the digital signal processor circuitry that follows the phase adjuster circuit is accommodated by integration on a semiconductor chip, the data concerned may be temporarily set inside the semiconductor chip for transmission to the shift register.

It is further noted that the bit number of read data synchronized with the read clocks as output from the read channel circuit should not be limited to the illustrative embodiments only: such may alternatively be 3 bits, 5 bits, 6 bits, or more. In such case the data transfer state may be likewise increased in number of combinability—namely, 3 combinations, 5 combinations, 6 combinations, or greater, while the shift registers and decoders for use with a specific pattern will also increase in number—that is, 3 systems, 5 systems, 6 systems, and more. Correspondingly, selection of the shift-register bits of the data being demodulated will be performed from 3 pieces, 5 pieces, 6 pieces, and more.

It must also be noted that in the case the digital signal processor system following the phase adjuster circuit is integrated on a semiconductor chip, the input pins of such semiconductor chip are present whose number corresponds to the bit number of read data from the read channel circuit, while a single input pin will exist which is for use with those read clocks synchronized thereto. This will be readily appreciated to a skilled person by referring to a listing of input, output, and input/output pins as set forth in currently available user's manuals of semiconductor chips.

Further, several parameters—including the PS pattern number, the division bit number in the pattern decoder with its pattern length lengthened, the number of decoders relative to the division bits, the stage number of adders, and the bit number of PS pattern detection level—should not be limited to the illustrative embodiments mentioned above.

The setup of the PS pattern detection level should not be limited to the settings as directly performed from a microcomputer, and may alternatively be such that where the system of this invention is implemented using a semiconductor chip, the intended setup is done through either an input pin for the semiconductor chip or an interface register provided on the semiconductor chip. In this case the bit number of pattern detection level will become apparent by reference to a listing of input, output, and input/output pins or alternatively register maps of microcomputer interfaces as recited in user's manuals of semiconductor chips.

The recording medium storing therein digital data should not be limited to the optical disk of the above-mentioned embodiments, and may also be applicable to digital signal processing systems which are designed to read digital data to be processed in the 1-bit serial form, generate bit clocks synchronized with the bit data, detect a specific pattern such as a sync patterns contained in the bit data being transferred, and then perform demodulation with respect to the transfer data that follows the specific pattern, such as for example record/reproduction apparatus for use with tape-shaped recording media, or record/playback equipment for magnetic disk record media, which may include functions of transferring the read data obtained after serial-to-parallel conversion with respect to the bit data synchronously with those read clocks obtainable by frequency division of the bit clocks, detecting a specific pattern such as a sync pattern contained in such read data, and demodulating the transfer data following the specific pattern. In this case also, the circuitry following the digital signal processor at the post stage of the phase adjuster circuit may be applicable to the case where the circuitry is implemented so that it is provided on a semiconductor chip.

The number of read clocks relative to the n-bit read data being transferred from the read channel circuit should not be limited to the embodiments stated above; it may alternatively be arranged so that the n-bit read data are divided into a specified number of portions which corresponds to the number of read clocks, and then are transferred synchronously with the read clocks corresponding to the resultant read data divided. For example, there will be a case where 4-bit read data is split into 2-bit segments which are transferred in synchronism with the rising and fall edges of read clocks. Alternatively, in one extreme case, it will also be possible that the n-bit read data is split into n segments which are sent synchronously with any one edge of a single read clock. In this case, at the phase adjuster circuit, each read data is temporarily set by a flip-flop in response to a read clock corresponding thereto, and then transferred to a shift register in synchronism with one edge of a single clock. The n shift registers perform data shifting for each read data to decode a specific pattern, such as sync pattern, in combination with shift-register bits. Further, when the digital signal processor circuit following the phase adjuster circuit is integrated on a semiconductor chip, there exist n read data input pins and read clock input pins that correspond in number to the divided read data. This will also become apparent by reference to a listing of input, output, and input/output pins as found in user's manuals of semiconductor chips.

The circuitry to be integrated on a semiconductor chip should not be limited to the one which covers the digital signal processor circuit following the phase adjuster circuit, and the present invention may also be applied to those cases where several processings are performed by the same semiconductor chip, which include directly inputting an analog signal that has been subject to waveform-equalization processing for elimination of undesired interference between signals with respect to a single signal as read out of a disk via a pickup, subsequent binalization processing (wave-shaping), PLL processing for generation of bit data and bit clocks of the period f with respect to resultant binary data, transfer processing for generating n-bit read data obtained through serial-to-parallel conversion of the data along with read clocks of period (n×f), and digital signal processing for sync signal detection and data demodulation. In this case, when such sync signal detection and data demodulation are effected with respect to (i+j×h)-bit frame data which consists of an i-bit sync pattern and h pieces of j-bit demodulation unit data, read clocks of period (n×f) will be output for the input bit rate f (where f is defined by a disk format so that this will be double, thrice, four-time, . . . when reproduction is made at multiple-speed rotation numbers such as double, thrice, four-time, . . . ) relative to the wave-shaped analog signal, thereby permitting a single sync detection operation for a group of (i+j×h) read clocks. Upon using a method for demodulation of j bits into k bits, k-bit demodulation data will be obtainable per read clock of period (n×f). The read clock and sync detection signal as well as demodulated data are output from specified pins of a semiconductor chip. This will also become apparent by referring to a listing of input, output, and input/output pins as found in user's manuals of semiconductor chips.

What is claimed is:

1. A digital signal processing circuit comprising an input circuit inputting digitized bit data of 1-bit serial form read out of a recording medium and one or more bit clocks with a period f (where f is a positive integer) generated synchronously with the data, a transfer circuit transferring resultant read data after serial-to-parallel conversion of said input bit data into n bits (where n is a positive number) synchronously with read clocks having a period of (f×n); a detection and demodulation circuit performing synchronizing (sync) pattern detection and demodulation with respect to one-frame data comprised of a synchronization pattern of i bits (where i is a positive number) being contained for transmission in the n-bit read data and h (where h is a positive integer) unitary j-bit data (where j is a positive integer) of demodulation processing; and a sync pattern detection circuit detecting a sync pattern upon every occurrence of (i+j×h)/n clocks having the period of (f×n) and corresponding to a data transfer amount of a single frame to output its detection result.

2. The digital signal processing circuit according to claim 1, wherein a demodulation processing scheme in said detection and demodulation circuit is a scheme for demodulating j bits into k bits (where j, k are positive integers), and wherein when a unitary data transfer amount to a memory circuit temporarily storing therein demodulated k-bit unit data is (k×t) bits (t is a positive integer), a relation in ratio of a clock number per unit time of more than one bit clock indicative of the data transfer amount toward a data demodulation circuit versus a transfer number per unit time representative of the data transfer amount to a memory storing therein resultant data after demodulation is defined by j:n/t.

3. The digital signal processing circuit according to claim 1, wherein a demodulation processing scheme in said detection and demodulation circuit is a scheme for demodulating j bits into k bits (j, k are positive integers), and wherein when a transfer unit to a memory circuit temporarily storing therein demodulated k-bit unitary data is (k×t) bits, a relation in ratio of a clock number per unit time of bit clocks indicative of the data transfer amount to a data demodulation circuit versus a transfer number per unit time representing the data transfer amount from a memory storing therein resultant data after demodulation is within a range of from j:n/t to j:n/(2×t).

4. A digital signal processor circuit comprising an input circuit inputting digital bit data of 1-bit serial form as read out of a recording medium and one or more bit clocks generated synchronously with the data with a period f (where f is a positive number); a transfer circuit transferring resultant read data after serial-to-parallel conversion of said input bit data into n bits (n is a positive integer) synchronously with read clocks having a period (f×n); a detection and demodulation circuit performing synchronizing (sync) pattern detection and demodulation with respect to one-frame data comprised of an i-bit (i is a positive integer) synchronization pattern being contained for transmission in the n-bit read data and h (h is a positive number) unitary j-bit data (j is a positive integer) of demodulation processing; and n shift registers performing data shifting with respect to each of n-bit read data;

n decode means performing decoding of the i-bit sync pattern;

determination means for determining sync pattern detection in accordance with detection status from the n decode means;

means for selecting a combination of bits of j-bit (j is a natural number) shift registers;

latch timing generator means for generating a latch timing signal for use with demodulation data on the basis of a determination output of said pattern detection determination circuit; and demodulator means coupled to an output of said selector means, for performing data demodulation with respect to j-bit data selected, wherein said selector means is responsive to detection of a sync pattern obtainable from one of the n decode means in said determination means for selecting a bit combination of shift registers of j-bit modulated data, and said timing generator means updates the latch timing every time sync pattern detection determination is made from said determinator means.

5. The digital signal processor circuit according to claim 4, wherein at least said n shift registers, n sync pattern decode means, determination means for judging a sync pattern detection, selector means of j-bit demodulation data, latch timing generator means, and demodulator means are provided on the same semiconductor chip.

6. The digital signal processor circuit according to claim 5, wherein n-bit data as input to the n shift registers on said semiconductor chip are transferred synchronously with bit clocks of period (f×n), and wherein said sync pattern detection determination means has means for generating a detection output of the sync pattern upon every receipt of (i+j×h)/n ones of the clocks of period (f×n).

7. The digital signal processor circuit according to claim 6, wherein detection output means of said sync pattern detection determinator means has on the semiconductor chip an output pin for use in taking out an output signal for determination of synchronization detection.

8. The digital signal processor circuit according to claim 5, wherein a demodulation processing scheme in said detection and demodulation circuit is a scheme for demodulating j bits into k bits (j, k are positive integers), and wherein when a transfer unit toward a memory means temporarily storing therein demodulated data after demodulation in units of k-bit segments is (k×t) bits (t is a positive integer), a relation in ratio of a clock number per unit time of bit clocks indicative of the data transfer amount to data demodulation means versus a transfer number per unit time representative of the data transfer amount to a memory means storing therein resultant data after demodulation is defined as j:n/t.

9. The digital signal processor circuit according to claim 5, wherein a demodulation processing scheme in said detection and demodulation circuit is a scheme for demodulating j bits into k bits (j, k are positive integers), and wherein when a transfer unit toward a memory means temporarily storing therein demodulated data in units of k-bit segments is (k×t) bits, a relation in ratio of a clock number per unit time of bit clocks indicative of the data transfer amount to data demodulator means versus a transfer number per unit time representing the data transfer amount from a memory means storing therein resultant data after demodulation is within a range of from j:n/t to j:n/(2×t).

10. A digital signal processor circuit comprising an input circuit inputting digital bit data of one-bit serial form as read out of a recording medium and with bit clocks generated synchronously with the data with a period f (where f is a positive number); a transfer circuit transferring resultant read data after serial-to-parallel conversion of said input bit data to n bits (n is a positive intger) synchronously with read clocks having a period of (f×n); a detection and demodulation circuit performing sync patterns detection and demodulation with respect to 1-frame data including a sync pattern consisting essentially of upper l-bit (l is a natural number) contained for transmission in the n-bit read data and lower m-bit (m is a natural number) being in common to all sync patterns, and h (h is a positive integer) unitary j-bit data (j is a natural number) of demodulation processing;

n shift registers for performing data shifting with respect to n-bit read data;

n decode means for performing decoding of an m-bit lower-level sync pattern;

decode means for decoding an l-bit upper-level sync pattern (l is a positive integer);

determination means for determining sync pattern detection on the basis of detection status from the n decode means;

means for selecting one or more shift register bits for execution of decoding of the l-bit upper-level sync pattern;

means coupled to an output of said determination means, for selecting more than one shift register bit for demodulation of the j-bit data;

latch timing generator means coupled to the output of said determination means, for generating a latch timing signal of demodulated data; and means for performing demodulation with respect to the j-bit data as selected by said selector means, wherein said selector means is responsive to detection of a lower-level sync pattern as obtained from one of n lower-level decode means in said determinator means, for selecting an l-bit upper-level sync pattern and a j-bit register bits of demodulated data, and said latch timing generator means updates the latch timing every time lower-level sync pattern detection determination is done at said determinator means.

11. The digital signal processor circuit according to claim 10, wherein at least said n shift registers, n lower-level sync pattern decode means, upper-level sync pattern decode means, determination means for determination of lower sync pattern detection, selector means for selection of an l-bit upper-level sync pattern, selector means of j-bit demodulation data, latch timing generator means, and demodulator means are provided on the same semiconductor chip.

12. The digital signal processor circuit according to claim 11, wherein n-bit data as input to n shift registers on said semiconductor chip is transferred synchronously with bit clocks of period (f×n), and wherein a detection output is obtained per period corresponding to ((1+m)+j×h)/n ones of the clocks of period (f×n).

13. The digital signal processor circuit according to claim 11, wherein a demodulation processing scheme used in said detection and demodulation circuit is a scheme for demodulating j bits into k bits (j, k are positive integers), and wherein when a transfer unit toward a memory means for temporary storage of demodulated k-bit unitary data is (k×t) bits (t is a positive integer), a relation in ratio of a clock number per unit time of bit clocks indicative of the data transfer amount to the data demodulator means versus a transfer number per unit time representative of the data transfer amount to a memory means storing therein resultant data after demodulation is defined by j:n/t.

14. The digital signal processor circuit according to claim 11, wherein a demodulation processing scheme used in said detection and demodulation circuit is a scheme for demodulating j bits into k bits (j, k are positive integers), and wherein when a transfer unit to a memory means temporarily storing therein k-bit unitary data after demodulation is (k×t) bits, a relation in ratio of a clock number per unit time of bit clocks indicative of the data transfer amount to the data demodulator means versus a transfer number per unit time representing the data transfer amount from a memory means storing therein resultant data after demodulation is within a range of from j:n/t to j:n/(2×t).

15. A digital signal processor circuit for reading a signal out of a data writable recording medium storing therein data in units of sectors each being of s bits (s is a positive integer) in total at least including a plurality of address marks (AM) composed of w bits (w is a positive integer) indicative of the top of pre-formatted physical addresses, a plurality of physical addresses, an r-bit (r is a positive integer) block sync pattern indicative of the top of data blocks within a data writable region, and one or more data blocks, for inputting digitized bit data of one-bit serial form along with bit clocks of a period f (f is a positive number) as generated in synchronism with the data, for transferring read data obtained after serial-to-parallel conversion of said bit data into n-bits (n is a positive integer) synchronously with bit clocks having a period of (f×n), for performing detection with respect to a w-bit address mark being contained for transmission in such n-bit read data and an r-bit block sync pattern, and for performing data demodulation with respect to the physical address and more than one data block in units of j bits, the digital signal processor circuit at least including:

n shift registers for performing data shifting with respect to n-bit read data;

n first decode means for decoding a w-bit address mark;

first determinator means for determining address mark detection on the basis of detection status from said n first decode means;

n second decode means for decoding a block sync pattern from r bits;

second determinator means for determining block sync pattern detection on the basis of detection status from said n second decode means;

means responsive to an output of said first and second determinator means, for selecting a shift register bit or bits to be subject to j-bit data demodulation;

means for generating a latching timing signal of demodulation data in response to outputs of said first and second determinator means; and means for performing demodulation with respect to the j-bit data selected by said selector means, wherein said selector means is operable to select register bits of j-bit demodulated data in accordance with detection of an address mark obtained from one of said n first decode means in said first determinator means for detection of the address mark (AM), or alternatively in accordance with detection of a block sync pattern obtained from one of said n second decode means in said second determinator means for block sync pattern detection, and said timing generator means updates the latch timing in every event of pattern detection judgment from said first and second determinator means.

16. The digital signal processor circuit according to claim 15, wherein at least said n shift registers, n first address mark decode means, first address mark detection determinator means, n second decode means for block sync pattern decoding, second block sync pattern detection determinator means, j-bit demodulation data selector means, latch timing generator means, and demodulator means are provided on the same semiconductor chip.

17. The digital signal processor circuit according to claim 16, wherein n-bit data being input to the n shift registers on said semiconductor chip is transferred synchronously with bit clocks of the (f×n) period, and wherein the digital signal processor circuit includes detector means for detecting for output at least one of a plurality of address marks contained in a single sector upon every occurrence of s/n ones of the clocks of period (f×n).

18. The digital signal processor circuit according to claim 16, wherein n-bit data being input to n shift registers on said semiconductor chip is transferred synchronously with bit clocks of period (f×n), and wherein the digital signal processor circuit includes detector means for detecting for output at least one of a plurality of address marks contained in one sector upon every occurrence of s/n ones of the clocks of period (f×n).

19. The digital signal processor circuit according to claim 16, wherein a demodulation processing scheme is a scheme for demodulating j bits into k bits (j, k are positive integers), and wherein when a transfer unit toward a memory means temporarily storing therein resultant data in units of k bits after execution of demodulation with respect to a data block is (k×t) bits (t is a positive integer), a relation in ratio of a clock number per unit time of bit clocks indicative of the data transfer amount to the data demodulation means versus a transfer number per unit time representative of the data transfer amount to a memory means storing therein resultant data after demodulation is given as j:n/t.

20. The digital signal processor circuit according to claim 16, wherein a demodulation processing scheme in said demodulation means is a scheme for demodulating j bits into k bits (j, k are positive integers), and wherein when a transfer unit to a memory means temporarily storing therein data in units of k bits after execution of demodulation with respect to a data block is (k×t) bits, a relation in ratio of a clock number per unit time of bit clocks indicative of the data transfer amount to the data demodulator means versus a transfer number per unit time representing the data transfer amount from a memory means storing therein resultant data after demodulation is within a range of from j:n/t to j:n/(2×t).

21. The digital signal processor circuit according to claim 15, including decode means for performing decoding of a block sync pattern contained in a recording region on a recording medium, said decode means being a predefined number, r/p, of decode means for dividing a block sync pattern of at least r bits into portions of p bits (where p is a positive integer defined by p≦r) and for decoding a divided pattern, adder means for adding together decode outputs from the r/p decode means to output an addition result of q bits (q is a positive integer as defined by q≦r/p), and comparator means for performing comparison of a preset detection level of q bits with the addition result to thereby output a decode result of the block sync pattern.

22. The digital signal processor circuit according to claim 21, wherein the setting of a q-bit block sync pattern detection level when providing on a semiconductor chip a block sync pattern decode means comprising said r/p decode means and said adder means as well as said comparator means is performed via one of an interface means with a system controller for control of an operation of the semiconductor chip and an interface register provided on the semiconductor chip.

* * * * *